United States Patent
Cohn et al.

(10) Patent No.: US 10,419,292 B2
(45) Date of Patent: Sep. 17, 2019

(54) IMPLEMENTING A SINGLE-ADDRESSABLE VIRTUAL TOPOLOGY ELEMENT IN A VIRTUAL TOPOLOGY

(71) Applicant: Oracle International Corporation, Redwood Shores, CA (US)

(72) Inventors: Daniel Cohn, Oakland, CA (US); Pradeep Vincent, Kenmore, WA (US); Jagwinder Singh Brar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 15/431,744

(22) Filed: Feb. 13, 2017

(65) Prior Publication Data
US 2018/0234298 A1    Aug. 16, 2018

(51) Int. Cl.
*H04L 12/24* (2006.01)
*H04L 29/08* (2006.01)

(52) U.S. Cl.
CPC .......... *H04L 41/12* (2013.01); *H04L 41/0816* (2013.01); *H04L 41/14* (2013.01)

(58) Field of Classification Search
CPC ..... H04L 41/12; H04L 41/0816; H04L 41/14; H04L 41/08; H04L 41/0893; H04L 41/0813; H04L 41/0806; H04L 45/02; H04L 67/00; H04L 67/10; H04L 67/125; H04L 67/2833; H04L 41/145
See application file for complete search history.

(56) References Cited

U.S. PATENT DOCUMENTS

| | | | | |
|---|---|---|---|---|
| 7,299,038 B2 * | 11/2007 | Kennedy | ................. | H04L 45/14 455/422.1 |
| 7,382,765 B2 * | 6/2008 | Kennedy | ............... | H04L 1/1685 370/351 |
| 7,453,864 B2 * | 11/2008 | Kennedy | ................. | H04L 45/22 370/351 |

(Continued)

FOREIGN PATENT DOCUMENTS

| CN | 102857475 A | * | 1/2013 | |
|---|---|---|---|---|
| CN | 103036703 A | * | 4/2013 | ......... H04L 12/4641 |

(Continued)

OTHER PUBLICATIONS

Cavdar, Cicek, "Optical Networks Virtual Topology Design", Optical Networks Lab (ON Lab), Royal Institute of Technology, Sep. 5, 2012, 69 pages.

(Continued)

*Primary Examiner* — Kostas J Katsikis
(74) *Attorney, Agent, or Firm* — Invoke

(57) ABSTRACT

Techniques for implementing a single-addressable virtual topology element (VTE) in a virtual topology. A VTE in a virtual topology may be distributed as multiple instantiated elements in a physical topology. However, the multiple instantiated elements are addressable as a single entity. Obtaining information associated with the VTE includes obtaining and aggregating information from each of the instantiated elements. Applying an overall configuration to the VTE includes determining a respective configuration for each instantiated element based on the overall configuration, and applying the respective configuration to each instantiated element.

20 Claims, 12 Drawing Sheets

(56) References Cited

U.S. PATENT DOCUMENTS

| | | | |
|---|---|---|---|
| 7,602,782 B2 | 10/2009 | Doviak et al. | |
| 7,813,263 B2 | 10/2010 | Chang et al. | |
| 7,958,087 B2* | 6/2011 | Blumenau | G06F 21/10 707/610 |
| 8,224,971 B1 | 7/2012 | Miller et al. | |
| 8,549,347 B1* | 10/2013 | Brandwine | H04L 41/0846 |
| 8,640,220 B1 | 1/2014 | Vincent et al. | |
| 9,112,777 B1* | 8/2015 | Barclay | H04L 41/0803 |
| 9,274,811 B1 | 3/2016 | Reeves et al. | |
| 9,450,817 B1 | 9/2016 | Bahadur et al. | |
| 9,806,948 B2 | 10/2017 | Masurekar et al. | |
| 9,825,822 B1 | 11/2017 | Holland | |
| 9,952,908 B2* | 4/2018 | Nedeltchev | H04L 67/02 |
| 9,979,602 B1* | 5/2018 | Chinnakannan | H04L 41/12 |
| 10,013,170 B1* | 7/2018 | Sahin | G06F 3/0608 |
| 10,116,732 B1* | 10/2018 | Canton | H04L 41/0813 |
| 10,142,183 B2* | 11/2018 | Cohn | H04L 41/12 |
| 10,218,597 B1* | 2/2019 | Miller | H04L 41/0876 |
| 10,291,507 B2* | 5/2019 | Cohn | H04L 43/12 |
| 2003/0189930 A1 | 10/2003 | Terrell et al. | |
| 2004/0044758 A1* | 3/2004 | Palmer | H04L 41/0213 709/223 |
| 2007/0112578 A1* | 5/2007 | Randle | H04L 63/0272 713/156 |
| 2007/0220203 A1 | 9/2007 | Murase | |
| 2009/0182915 A1* | 7/2009 | Farrell | G06F 9/30003 710/104 |
| 2009/0248896 A1 | 10/2009 | Cohn | |
| 2011/0022795 A1 | 1/2011 | Murase | |
| 2012/0210066 A1* | 8/2012 | Joshi | G06F 12/0866 711/118 |
| 2013/0163601 A1* | 6/2013 | Kim | H04L 45/02 370/400 |
| 2013/0211870 A1* | 8/2013 | Lawson | G06Q 10/06315 705/7.25 |
| 2013/0212420 A1* | 8/2013 | Lawson | G05B 19/4185 713/400 |
| 2013/0218909 A1* | 8/2013 | Chu | G06Q 10/10 707/752 |
| 2014/0098673 A1* | 4/2014 | Lee | H04L 45/64 370/238 |
| 2014/0195689 A1* | 7/2014 | Gill | H04L 67/2833 709/226 |
| 2014/0207861 A1* | 7/2014 | Brandwine | H04L 51/32 709/204 |
| 2015/0074450 A1* | 3/2015 | Blount | G06F 11/0727 714/6.1 |
| 2015/0095448 A1* | 4/2015 | Hwang | H04L 67/2842 709/216 |
| 2015/0193317 A1* | 7/2015 | Firley | H04L 69/40 714/4.11 |
| 2015/0195137 A1 | 7/2015 | Kashyap et al. | |
| 2015/0237117 A1* | 8/2015 | Taylor | H04L 67/10 709/229 |
| 2015/0244617 A1 | 8/2015 | Nakil et al. | |
| 2015/0304176 A1* | 10/2015 | Ting | H04L 67/1031 709/203 |
| 2015/0339150 A1* | 11/2015 | Yanagisawa | G06F 9/45558 718/1 |
| 2015/0379429 A1* | 12/2015 | Lee | G06N 20/00 706/11 |
| 2016/0080496 A1* | 3/2016 | Falanga | H04M 3/22 709/217 |
| 2016/0094643 A1* | 3/2016 | Jain | H04L 45/44 709/226 |
| 2016/0105893 A1* | 4/2016 | Senarath | H04W 4/021 370/329 |
| 2016/0112497 A1* | 4/2016 | Koushik | H04L 67/10 726/7 |
| 2016/0132214 A1* | 5/2016 | Koushik | H04L 63/10 715/741 |
| 2016/0132310 A1* | 5/2016 | Koushik | G06F 8/61 717/176 |
| 2016/0134558 A1* | 5/2016 | Steinder | H04L 47/783 709/226 |
| 2016/0218918 A1 | 7/2016 | Chu et al. | |
| 2016/0323377 A1* | 11/2016 | Einkauf | H04L 67/1076 |
| 2016/0364382 A1* | 12/2016 | Sarikaya | G06F 16/3322 |
| 2017/0063613 A1* | 3/2017 | Bloch | H04L 12/44 |
| 2017/0180154 A1 | 6/2017 | Duong et al. | |
| 2017/0302565 A1 | 10/2017 | Ghobadi et al. | |
| 2018/0041398 A1* | 2/2018 | Cohn | H04L 41/12 |
| 2018/0062932 A1* | 3/2018 | Cohn | H04L 41/12 |
| 2018/0107561 A1 | 4/2018 | Bender et al. | |
| 2018/0107563 A1 | 4/2018 | Bender et al. | |
| 2018/0139099 A1* | 5/2018 | Amin | H04L 41/12 |
| 2018/0159801 A1 | 6/2018 | Rajan et al. | |
| 2018/0205673 A1 | 7/2018 | Jain et al. | |
| 2018/0234298 A1 | 8/2018 | Cohn et al. | |
| 2018/0234322 A1* | 8/2018 | Cohn | H04L 43/12 |
| 2018/0316594 A1* | 11/2018 | Wu | H04L 45/02 |

FOREIGN PATENT DOCUMENTS

| | | | |
|---|---|---|---|
| CN | 104301321 A * | 1/2015 | |
| CN | 104518897 A * | 4/2015 | |
| CN | 104660553 A * | 5/2015 | |
| JP | 2012243254 A * | 12/2012 | G06F 9/45558 |
| JP | 2015172964 A * | 10/2015 | |

OTHER PUBLICATIONS

"Comparison of Firewalls," Wikipedia, available at https://en.wikipedia.orgiwiki/Comparison_of_firewalls (accessed on May 6, 2016).

* cited by examiner

Instantiated
Elements
in a
Physical Topology
900

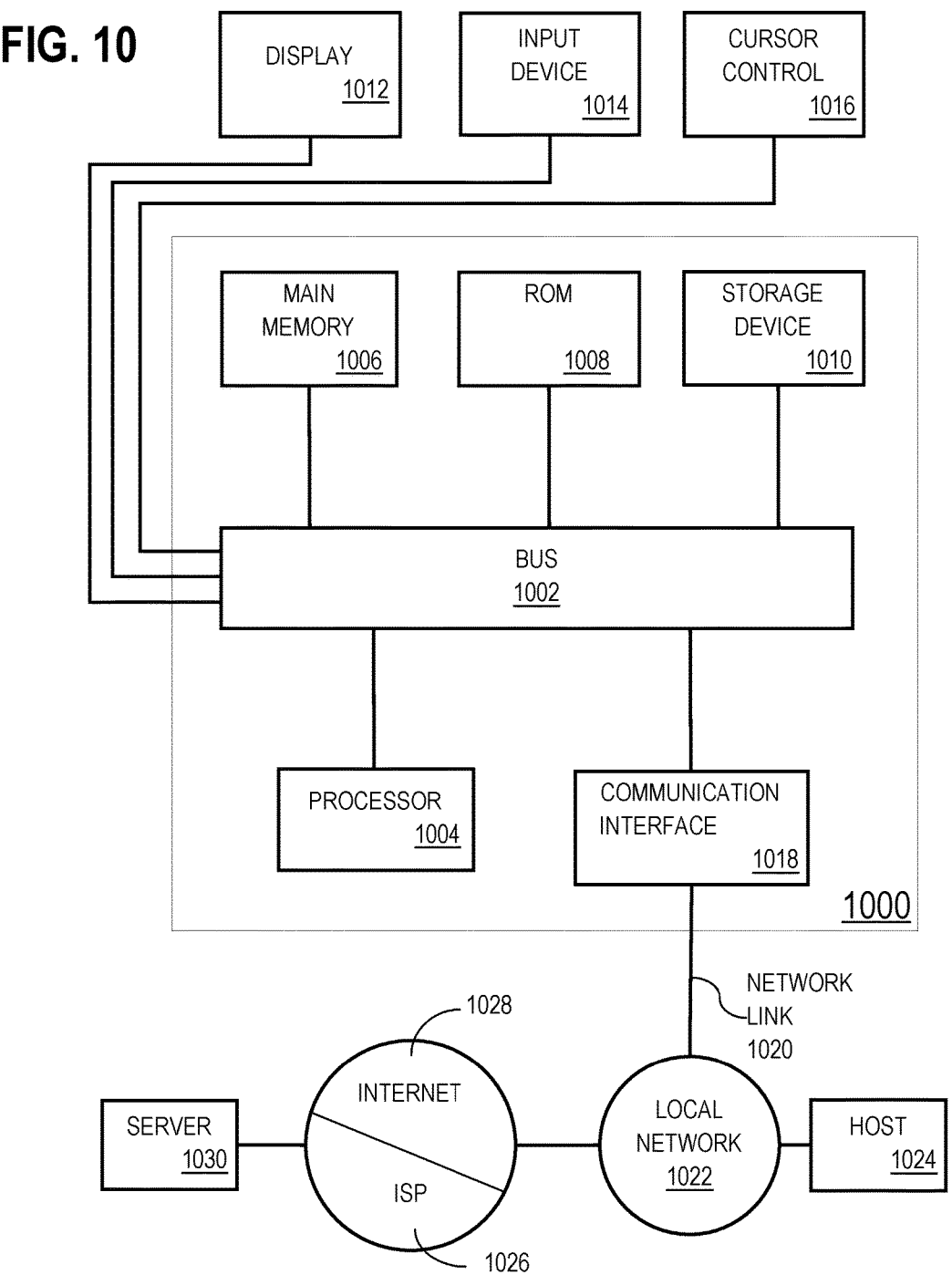

IMPLEMENTING A SINGLE-ADDRESSABLE VIRTUAL TOPOLOGY ELEMENT IN A VIRTUAL TOPOLOGY

RELATED APPLICATION; INCORPORATION BY REFERENCE

This application is related to U.S. Non-Provisional patent application Ser. No. 15/431,426, filed Feb. 13, 2017, which is hereby incorporated by reference.

TECHNICAL FIELD

The present disclosure relates to computer networks. In particular, the present disclosure relates to implementing a single-addressable virtual topology element (VTE) in a virtual topology.

BACKGROUND

A computer network provides connectivity among a set of nodes. The set of nodes are connected by a set of links. The nodes may be local to and/or remote from each other. The nodes are connected by one or more links. Examples of links include a coaxial cable, an unshielded twisted cable, a copper cable, an optical fiber, and a virtual link.

A subset of nodes implements the computer network. Such nodes may be referred to as "service nodes." Examples of such nodes include a switch, a router, a firewall, and a network address translator (NAT). Each node performs one or more functions, such as but not limited to routing data, filtering data, inspecting data, processing data, and/or storing data. Each node may be implemented by a function-specific hardware device and/or a generic machine.

Another subset of nodes uses the computer network. Such nodes may be referred to as "hosts" or "host nodes." Hosts may execute a client process and/or a server process. A client process makes a request for a computing service (such as, execution of a particular application, and/or storage of a particular amount of data). A server process responds by executing the requested service and/or returning corresponding data.

A computer network may provide connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Such a computer network may be referred to as a "cloud network."

A computer network may be shared amongst multiple entities that are independent from each other (also referred to as "tenants" or "customers"). The computer network and the network resources thereof are accessed by clients corresponding to different tenants. Such a computer network may be referred to as a "multi-tenant computer network." Different tenants may demand different network requirements for the computer network. The same computer network may need to implement different network requirements demanded by the different tenants.

An entity, such as an individual or company, may request utilization of a computer network including a particular arrangement of digital devices in order to achieve various security, performance, and/or resiliency goals. As data traverses the particular arrangement of digital devices, the digital devices perform respective functions associated with the data. As an example, a security goal of a computer network may be to filter out spam mail. A digital device performing a mail filtering function may be included in the computer network. The digital device may be configured for filtering mail received by the computer network. The digital device may inspect the incoming mail to determine whether the incoming mail includes any spam mail. The digital device filters out the spam mail while forwarding the remaining mail to destinations within the computer network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with one or more embodiments.

DETAILED DESCRIPTION

Figure 1:
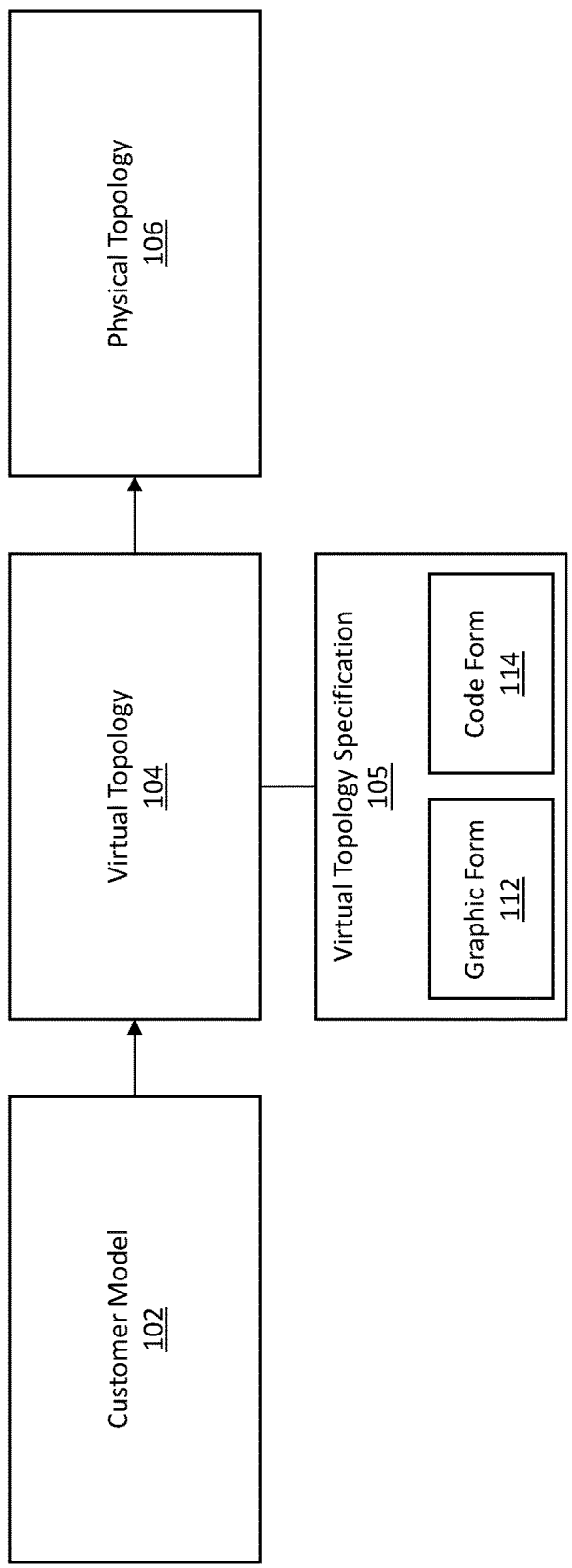
FIG. 1 illustrates relationships between a customer model, a virtual topology, and a physical topology, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PHYSICAL TOPOLOGIES AND VIRTUAL TOPOLOGIES
3. SINGLE-ADDRESSABLE VTE SIMULATION SYSTEM ARCHITECTURE

4. IMPLEMENTING A SINGLE-ADDRESSABLE VTE IN A VIRTUAL TOPOLOGY
5. EXAMPLE EMBODIMENTS
6. COMPUTER NETWORKS
7. MISCELLANEOUS; EXTENSIONS
8. HARDWARE OVERVIEW

1. General Overview

In one or more embodiments, a computer network is implemented in accordance with a virtual topology that is instantiated on a physical topology.

A physical topology is a particular arrangement of digital devices, such as function-specific hardware devices and/or generic machines.

A virtual topology is a particular arrangement of virtual topology entities (VTEs). Each VTE is associated with one or more functions. Examples of functions include data routing, data filtering, data inspection, data storage, and/or any other type of data processing function. The virtual topology, and the VTEs therein, are specified in a virtual topology specification.

Instantiated elements are executed on a physical topology based on a virtual topology. During instantiation, VTEs of a virtual topology are mapped to digital devices of a physical topology. A VTE may correspond to a digital device itself, or a virtual component executing on the digital device. A single VTE may be mapped to multiple digital devices. Conversely, multiple VTEs may be mapped to a single digital device. A particular digital device mapped to a particular VTE implements the functions corresponding to the particular VTE. The virtual topology specification may but does not necessarily include any reference to a physical topology or digital devices therein. The virtual topology specification may but does not necessarily specify which digital devices of the physical topology perform which functions of which VTEs.

Multiple computer networks, implemented in accordance with respective virtual topologies, may be instantiated on a single physical topology. As an example, multiple tenants may share a set of digital devices, which are arranged according to a physical topology. Each tenant may have a different desired arrangement of VTEs. Each arrangement of VTEs corresponds to a different virtual topology. Each virtual topology, of the respective tenants, may be instantiated on the physical topology.

One or more embodiments include implementing a single-addressable VTE in a virtual topology. A VTE in a virtual topology may be distributed as multiple instantiated elements in a physical topology. A VTE may be distributed as multiple instantiated elements for efficiency, performance, resiliency, and/or other purposes. However, the multiple instantiated elements are addressable as a single entity. In this regard, the multiple instantiated elements simulate a single entity. Examples of addressing the VTE as a single entity include obtaining information associated with a single-addressable VTE and configuring a single-addressable VTE.

One or more embodiments include obtaining information associated with a single-addressable VTE. A request for information associated with a VTE is received. A set of instantiated elements, in a physical topology, that is configured to perform a function associated with the VTE is identified. Information is obtained from each instantiated element. The information from the multiple instantiated elements is aggregated to obtain information associated with the VTE. A user interface may present the information associated with the VTE.

One or more embodiments include configuration a single-addressable VTE. A request to apply a configuration to a VTE is received. A set of instantiated elements, in a physical topology, that is configured to perform a function associated with the VTE is identified. At least a portion of the configuration is applied to each instantiated element.

One or more embodiments described in this Specification and/or recited in the claims may not be included in this General Overview section.

2. Physical Topologies and Virtual Topologies

FIG. 1 illustrates relationships between a customer model 102, a virtual topology 104, and a physical topology 106, in accordance with one or more embodiments.

In one or more embodiments, a physical topology 106 includes a particular arrangement of digital devices of a computer network. Digital devices include function-specific hardware devices and/or generic machines. An example of a physical topology 106 is discussed below with reference to FIG. 3.

The term "digital device" generally refers to any hardware device that includes a processor. Examples of digital devices include a computer, a tablet, a laptop, a desktop, a netbook, a server, a web server, a network policy server, a proxy server, a generic machine, a hardware router, a hardware switch, a hardware firewall, a hardware firewall, a hardware network address translator (NAT), a hardware load balancer, a function-specific hardware device, a mainframe, a television, a content receiver, a set-top box, a printer, a mobile handset, a smartphone, and a personal digital assistant (PDA).

In an embodiment, the digital devices of a physical topology 106 form a computer network that provides connectivity between clients and network resources. Network resources include hardware and/or software configured to execute server processes. Examples of network resources include a processor, a data storage, a virtual machine, a container, and/or a software application. Network resources are shared amongst multiple clients. Such a computer network may be referred to as a "cloud network."

Additionally, the digital devices of a physical topology 106 form a computer network that is shared amongst multiple tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, and/or tenant isolation. As an example, Best Bank may require that all emails pass through a particular firewall before entering a computer network that processes the data of Best Bank. State Security Agency may require that address translation be applied to all data entering a computer network that processes the data of State Security Agency. The same computer network may need to implement different network requirements demanded by different tenants. A multi-tenant computing network may also be an off-premise computer network, as the computer network may be implemented at a location that is away from the premises of the tenants served by the computer network.

Additional embodiments and/or examples relating to Computer Networks are described below in Section 6, titled "Computer Networks."

In one or more embodiments, a customer model 102 includes a particular arrangement of components of a computer network that is requested by a customer. The computer network may be an on-premise network of the customer and/or a private network of the customer. A customer model 102 may correspond to a computer network that is implemented by the customer and/or a customer's design of a computer network. A customer may request a particular customer model 102 in order to satisfy network requirements as well as security, performance, behavioral, and/or resiliency goals. As an example, a customer model may include (a) a primary server and (b) a backup server that duplicates the primary server. The backup server may replace the primary server in the event a failure occurs with the primary server. The customer model includes the duplicated servers to increase a level of resiliency of the computer network.

In an embodiment, a customer model 102 may include an arrangement of digital devices that is unnecessarily duplicative and/or inefficient. The inefficiencies may be a result of the constraints imposed by the physical nature of customer model 102. As an example, a physical design may include specification of each redundant paired component and corresponding interconnections. The physical design may specify that the redundant paired components are horizontally scaled according to a particular heuristic. The physical design may include specification of each scaled element and corresponding interconnections. The specification of redundant elements may give rise to inefficiencies.

In an embodiment, a customer may request implementation of a customer model 102 on a multi-tenant computer network. Implementation of the customer model 102 may include migrating a computer network already implemented by the customer onto the multi-tenant computer network. However, the customer model 102 may have no relationship to the physical topology 106 of the multi-tenant computer network. The customer model 102 and the physical topology 106 of the multi-tenant computer network may include different components and/or a different arrangement of the components. As explained in further detail below, the customer model 102 may be used to determine a virtual topology 104, which is used to instantiate various elements on a physical topology 106.

In one or more embodiments, a virtual topology 104 includes a particular arrangement of virtual topology entities (VTEs). Each VTE is associated with one or more functions. A VTE (which may be referred to as a "service VTE") may implement a function in order to satisfy network requirements and/or improve security, resiliency, and/or performance levels. Additionally or alternatively, a VTE (which may be referred to as a "host VTE") may implement a function to process and/or store data of a computer network. A host VTE may use the services provided by one or more service VTEs. Examples of functions performed by VTEs include but are not limited to the ability to:
 (a) Routing and/or forwarding data to a next hop;
 (b) Filtering and/or rejecting data based on a criterion;
 (c) Inspecting data for security issues and/or other issues;
 (d) Hiding and/or modifying a source address and/or destination address of data;
 (e) Distributing data to resources based on availability of resources;
 (f) Compressing data;
 (g) Caching data;
 (h) Storing data; and
 (i) Processing data.

A VTE associated with a particular function may operate as a particular type of virtual component and/or physical component. Examples of VTEs include but are not limited to a gateway, a router, a switch, a hub, a proxy, a firewall, an intrusion detection system (IDS), a network address translator (NAT), a load balancer, and a network optimizer.

As an example, a VTE may filter data based on a set of security rules specified by a user (such as, a network administrator). The VTE may reject data based on the contents of the Internet Protocol (IP) and Transport headers of the data. The VTE may operate as an IP firewall. Other VTEs may filter data based on other characteristics of the data, such as the contents corresponding to the application layer of the data. These other VTEs may operate as firewalls of different types.

As another example, a VTE may monitor data for offline analysis of security anomalies. Offline analysis means that the analysis is performed after a decision to allow or reject data has already been made (this decision may be made by a firewall). Offline analysis allows the VTE to perform more complex inspection of the data than the firewall. The VTE may operate as an IDS.

As another example, a VTE may replace the source address and/or destination address of the data. The VTE may operate as a NAT. In some cases, multiple client devices within a particular Local Area Network (LAN) may share a single external or public IP address. The client devices may be assigned private IP addresses. A particular client device may transmit data to an external network outside of the LAN via a NAT. The source address of the data may be the private IP address of the particular client device. The NAT may replace the source address with the public IP address (used for outbound communication from all client devices in the LAN) prior to transmitting the data to the external network.

As another example, a VTE may serve as a single point of entry to multiple services. The VTE may forward service requests to a particular component based on the load of the components in the computer network. The VTE may operate as a load balancer.

As another example, a VTE may perform various functions to improve latency, bandwidth consumption, and/or other performance parameters of a computer network. The VTE may eliminate the transfer of redundant data. The VTE may perform compression and/or caching. The VTE may set an upper limit on the amount of data that may be transmitted by a particular client device over a particular time period. The VTE may operate as a network optimizer.

In one or more embodiments, a virtual topology specification 105 is a description of a virtual topology 104. A virtual topology specification 105 describes the functions of each VTE in a virtual topology 104. A virtual topology specification 105 may but does not necessarily include any reference to a physical topology 106 and/or digital devices therein. A virtual topology specification 105 may but does not necessarily specify which digital devices of a physical topology 106 perform which functions of which VTEs. The description of the particular arrangement of VTEs may be provided in various forms, such as graphic form 112 and/or code form 114.

A graphic form 112 of a virtual topology specification 105 may include a graph of the VTEs, such as the graph illustrated in FIG. 2, described below. A graphic form 112 may be specified by user input via a user interface. As an example, a user interface may include drag-and-drop functionality. A user may drag-and-drop a particular VTE to a particular location of a graph presented on the user interface. The user may connect the particular VTE to other VTEs already shown on the graph. The user may configure each VTE through the user interface. Based on the user input, the particular arrangement of the VTE in relation to the other VTEs already shown on the graph is specified.

A code form 114 of a virtual topology specification 105 may include lines of code, commands, or other textual descriptions of the particular arrangement of VTEs. As an example, a particular line of code may specify a name and/or function of a particular VTE. Another line of code may specify a particular arrangement of various VTEs. Code form 114 may be expressed in any computing language, such as XML (Extensible Markup Language), JSON (JavaScript Object Notation), YAML, Java, C++, C, C#, and Python.

In an embodiment, a virtual topology specification 105 includes a description of one or more forwarding policies. A forwarding policy specifies reachability between VTEs. The forwarding policy determines a next hop for a data packet based upon a destination prefix of the data packet and/or other metadata. Other metadata may include a port from which the data packet was received, or a hash value of a particular field of the data packet. The forwarding policy may be applied to Layer 3 transport protocols and/or Layer 2 transport protocols.

A forwarding policy may specify intermediate VTEs to be traversed between a particular VTE and a related VTE. As an example, there may be multiple paths between a source VTE and a destination VTE. One path may include the source VTE, VTE A, and the destination VTE. Another path may include the source VTE, VTE B, and the destination VTE. A forwarding policy may specify that for a data packet coming from the source VTE and destined for the destination VTE, the next hop is VTE A. Hence, a data packet would traverse the path including VTE A, instead of the path including VTE B.

A forwarding policy may specify filtering criteria for data packets transmitted between two VTEs. As an example, VTEs of a virtual topology may include two subnetworks. A forwarding policy may specify that data packets transmitted between the two subnetworks must first pass through a particular firewall. As another example, VTEs of a virtual topology may include two subnetworks. A forwarding policy may specify that data packets addressed to a particular address within one of the subnetworks must be dropped.

A forwarding policy applicable to a particular relationship corresponding to a particular VTE may also be applicable to another relationship corresponding to the particular VTE. The forwarding policy is applicable to the other relationship if the other relationship depends on the particular relationship.

As an example, a virtual topology may include a relationship between VTE A and VTE B (also referred to as the "VTE A-VTE B relationship"). The VTE A-VTE B relationship may include a forwarding policy requiring that data transmitted between VTE A and VTE B first pass through a firewall VTE. Additionally, the virtual topology may include a relationship between VTE B and VTE C (also referred to as the "VTE B-VTE C relationship"). The VTE B-VTE C relationship may include a forwarding policy that allows all data to be transmitted directly between VTE B and VTE C.

In this example, the VTE A-VTE B relationship and the VTE B-VTE C relationship provides reachability between VTE A and VTE C. VTE A may transmit data to VTE C by first transmitting the data to VTE B, which then forwards the data to VTE C. Hence, the relationship between VTE A and VTE C (also referred to as the "VTE A-VTE C relationship") depends on the VTE A-VTE B relationship.

Continuing this example, VTE A may transmit data to VTE C through VTE B. As the data is transmitted from VTE A to VTE B, the forwarding policy associated with the VTE A-VTE B relationship may be applied. Based on the forwarding policy, VTE A may transmit the data to the firewall VTE. If the data passes the filtering policy of the firewall VTE, then the firewall VTE may transmit the data to VTE B. VTE B may transmit the data to VTE C. In this example, the forwarding policy applicable to the VTE A-VTE B relationship is applicable to the VTE A-VTE C relationship. This example illustrates the transitive nature of forwarding policies with respect to the relationships corresponding to a VTE.

In an embodiment, a virtual topology 104 serves as an intermediary state between customer model 102 and physical topology 106. A virtual topology 104 may be a modified and/or simplified version of a customer model 102, while still satisfying the network requirements and/or goals of the customer model 102. In some cases, as described above, a customer model 102 may include various inefficiencies. As an example, a customer model may include redundant paired firewalls in a physical design. A virtual topology may include a single firewall. The single firewall is a VTE in the virtual topology. The virtual topology is specified with the assumption of resiliency. Resiliency is achieved by the nature of the virtual topology. If the VTE implementing the firewall functionality fails, then a new VTE configured to implement the firewall functionality is instantiated. In this example, the virtual topology describes a simplified version of the customer model, while maintaining the firewall functionality of the customer model.

Additionally, a virtual topology 104 may be instantiated on physical topology 106. During instantiation, VTEs of the virtual topology are mapped to digital devices of the physical topologies. A single VTE may be mapped to multiple digital devices. Conversely, multiple VTEs may be mapped to a single digital device. A particular digital device mapped to a particular VTE implements the functions corresponding to the particular VTE.

Multiple virtual topologies 104 may be instantiated by a single physical topology 106. As an example, multiple tenants may share a set of digital devices corresponding to a physical topology. Meanwhile, each tenant may desire a different arrangement of VTEs for implementing a computer network that satisfies the tenant's particular network requirements. A different virtual topology may be required for each tenant. The same set of digital devices may be used to instantiate the multiple different virtual topologies.

Additional embodiments and/or examples relating to instantiation of virtual topology 104 on physical topology 106 are described below with reference to FIGS. 4A-B.

2.1 An Example of a Virtual Topology

Figure 2:
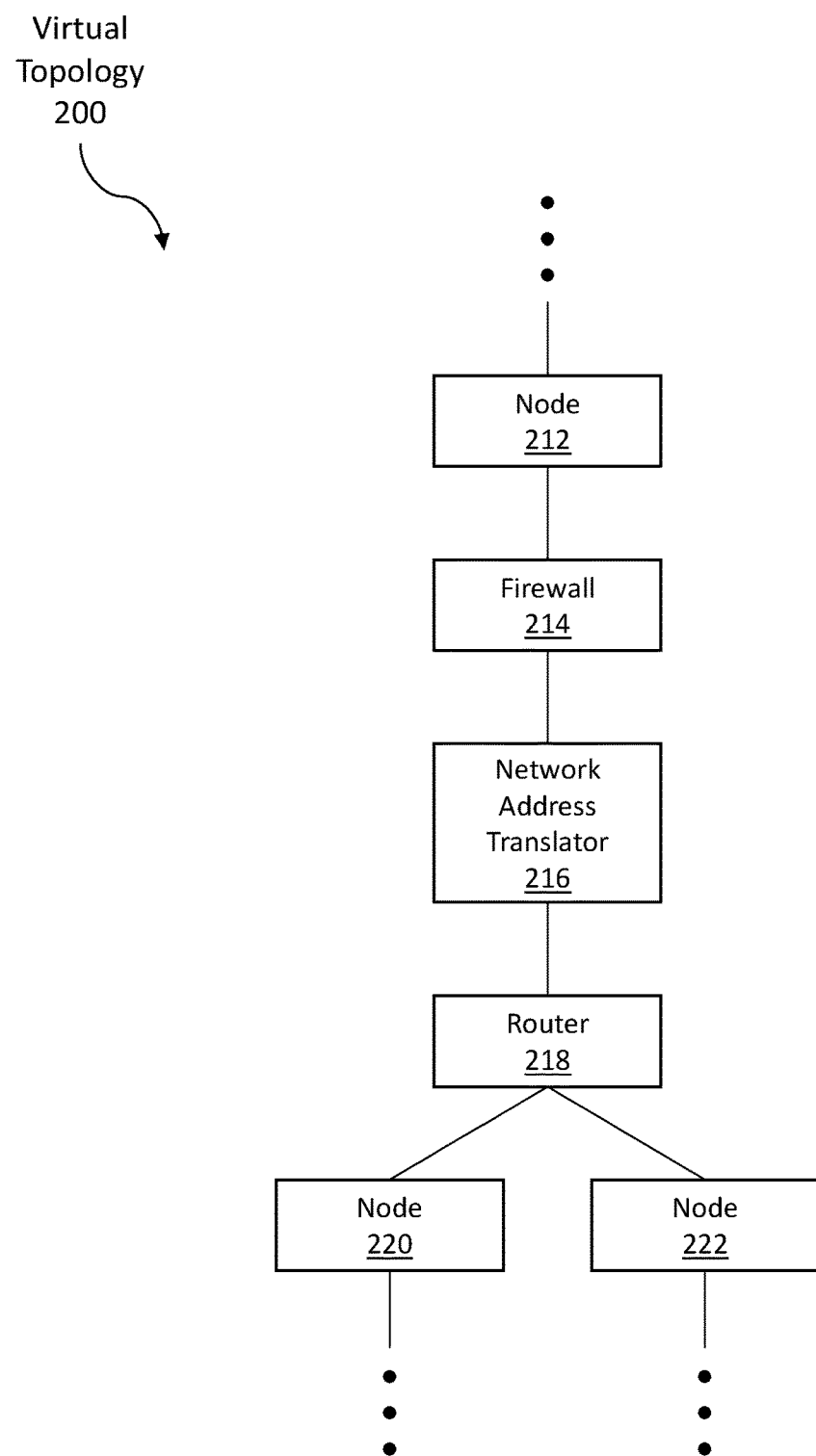
FIG. 2 illustrates an example of a virtual topology, in accordance with one or more embodiments.

FIG. 2 illustrates an example of a virtual topology, in accordance with one or more embodiments. As illustrated, a virtual topology 200 includes various VTEs, including node 212, firewall 214, network address translator (NAT) 216, router 218, node 220, and node 222. A virtual topology 200 may include more or fewer VTEs than the VTEs illustrated in FIG. 2. Each VTE is represented as a box. A connection between the VTEs is represented by a line.

In an embodiment, a virtual topology specification, describing the virtual topology 200, may be generated by a user submitting user input via a user interface. As an example, the user may be a representative of a customer (e.g., company with data being stored/processed by a cloud network), or a representative of a third party company implementing the computer network. The user may dragand-drop a VTE to a particular location on a graph presented by the user interface. The user may label the VTE as "node 212." The user may drop-and-drop another VTE to another location on the graph. The user may label the VTE as "firewall 214." The user may add a line connecting node 212 and firewall 214. The user may further specify the functions performed by node 212 and firewall 214.

Example virtual topology 200 specifies how data is supposed to traverse through the VTEs. Data is supposed to traverse through the VTEs according to the connections linking the VTEs. As illustrated, for example, data may be transmitted from node 212 to node 220 by traversing through firewall 214, NAT 216, and router 218. At firewall 214, the data may be processed to perform a firewall functionality associated with firewall 214. Based on the firewall functionality, the data may be inspected to determine whether to allow the data to pass through. Additionally, at NAT 216, the data may be processed to perform a NAT functionality associated with NAT 216. Based on the NAT functionality, the source address and/or destination address of the data may be modified. Additionally, at router 218, the data may be processed to perform the routing functionality of router 218. Based on the routing functionality, the next hop of the data may be identified as node 220. Router 218 may forward the data to node 220.

2.2 An Example of a Physical Topology

Figure 3:
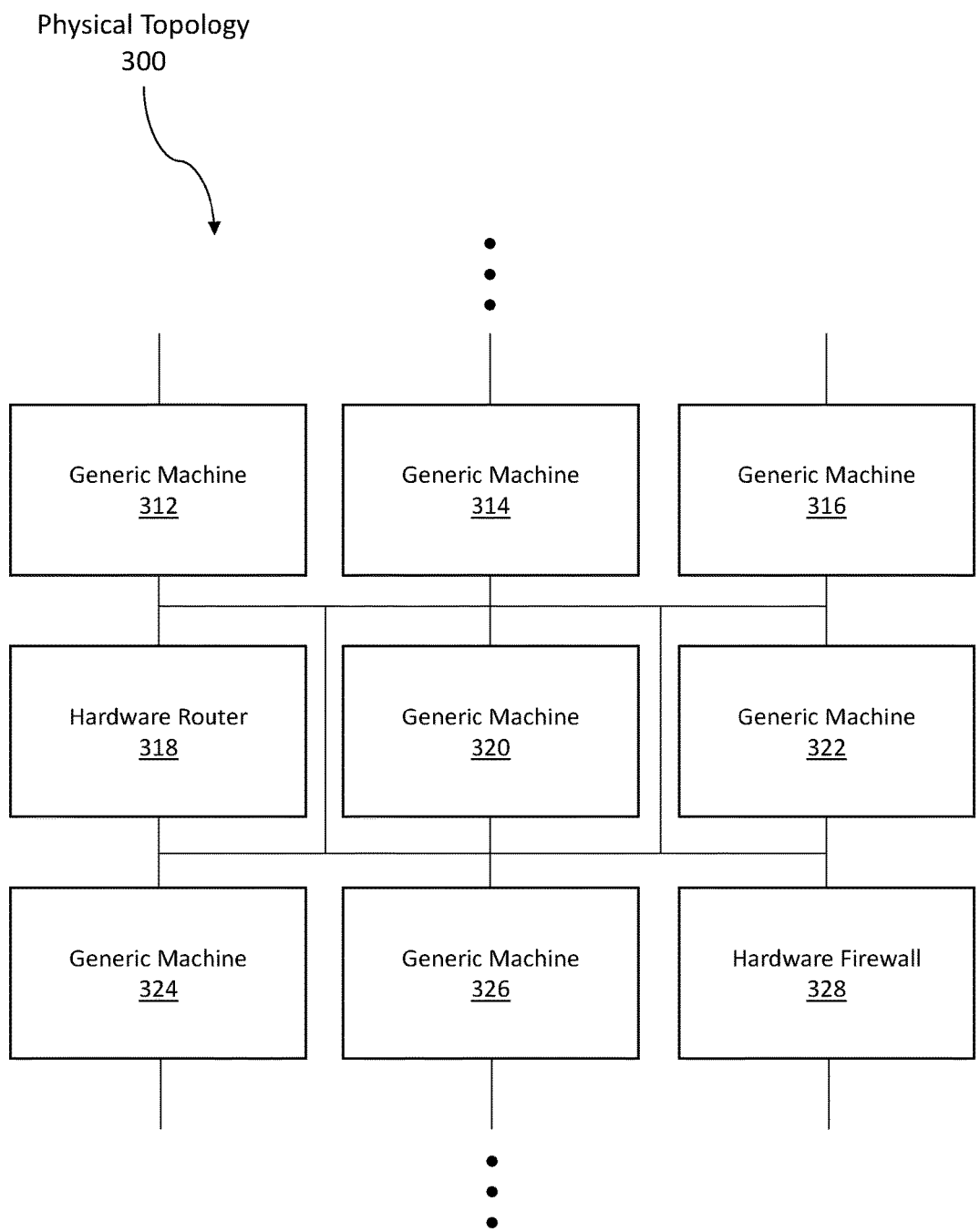
FIG. 3 illustrates an example of a physical topology, in accordance with one or more embodiments.

FIG. 3 illustrates an example of a physical topology, in accordance with one or more embodiments. As illustrated, physical topology 300 includes various digital devices, including generic machines 312-316 and 320-326, hardware router 318, and hardware firewall 328. Physical topology 300 may include more or fewer digital devices than the digital devices illustrated in FIG. 3. Each digital device is represented as a box. Each digital device may be connected to any number of one or more other digital devices within physical topology 300. The digital devices may be located in a single geographical location or distributed across various geographical locations.

In an embodiment, physical topology 300 may correspond to a cloud network. The digital devices shown in physical topology 300 may be shared amongst multiple client devices and/or tenants. A particular digital device may perform a same function for different client devices and/or tenants. A particular digital device may perform different functions for different client devices and/or tenants.

2.3 Instantiation of a Virtual Topology on a Physical Topology

There may be multiple ways to instantiate the same virtual topology on a physical topology. Instantiation of a virtual topology on a physical topology 300 includes mapping VTEs in a virtual topology to digital devices of the physical topology 300.

VTEs in a virtual topology may be executed in an overlay network. A VTE is associated with both a middlebox and a gateway. The middlebox is configured to implement the function of the VTE. The gateway is configured to transmit and/or receive data via the overlay network.

The overlay network is implemented on top of an underlay network corresponding to the physical topology. Each VTE is associated with two addresses: (a) an overlay address corresponding to the VTE and (b) an underlay address corresponding to the digital device on which the VTE is instantiated. The addresses may be fixed (for example, entered by a network administrator). Additionally or alternatively, the addresses may be dynamically assigned (for example, by a Dynamic Host Configuration Protocol (DHCP) and/or another application). Data is transmitted between VTEs in a virtual topology by tunneling through the underlying network. Tunneling is further described below with reference to FIG. 4A.

Figure 4A:
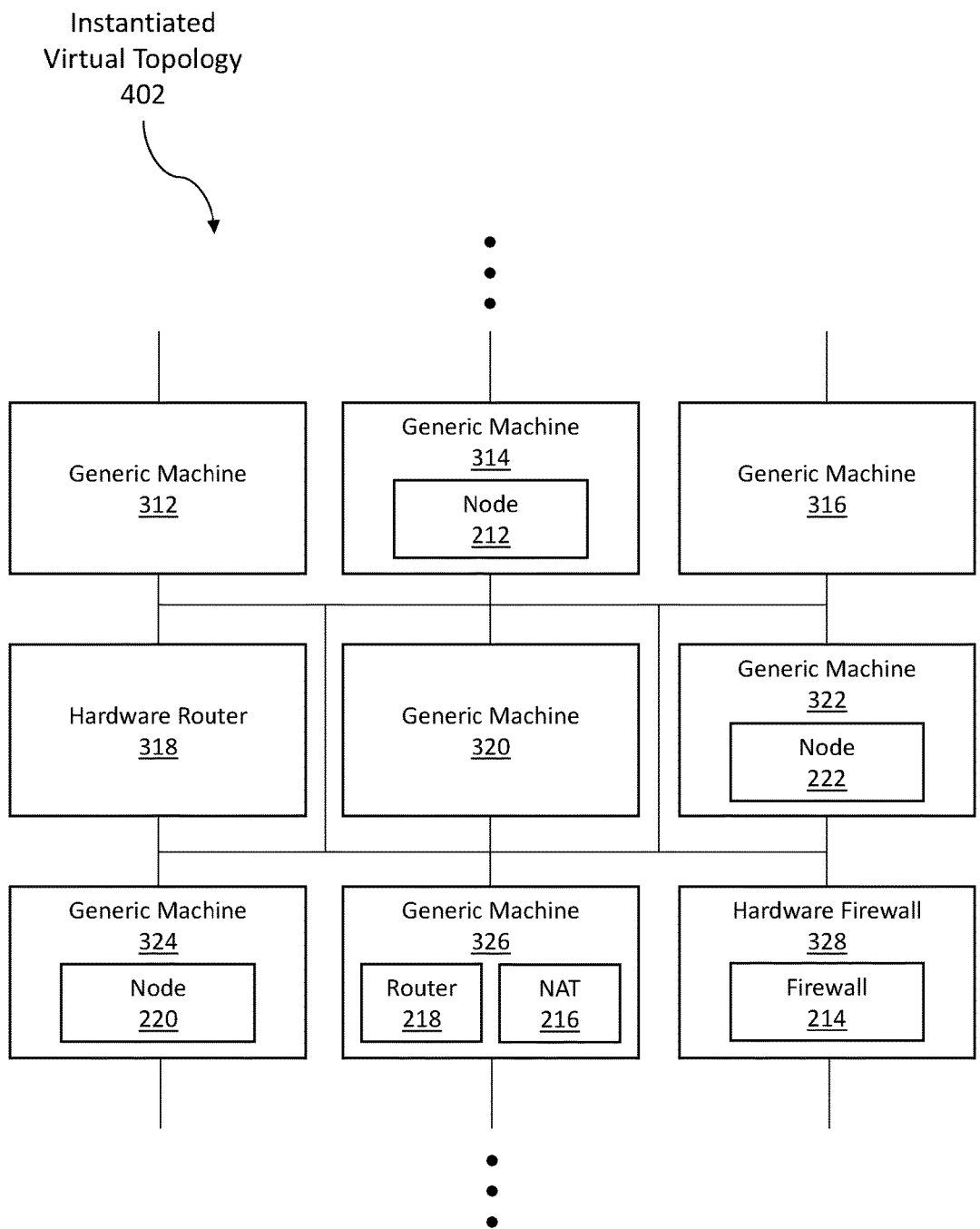
FIGS. 4A-B illustrate examples of an instantiated virtual topology, in accordance with one or more embodiments.

FIG. 4A illustrates an example of an instantiated virtual topology 402. The instantiated virtual topology 402 is based on the virtual topology 200 (illustrated in FIG. 2) and the physical topology 300 (illustrated in FIG. 3). An element of FIG. 4A that is labeled with a same number as a particular element of FIG. 2 or 3 corresponds to the particular element of FIG. 2 or 3.

A generic machine of physical topology 300 executing a virtual machine and/or software application may instantiate a VTE of a virtual topology 200. As illustrated, generic machine 314 instantiates node 212. Generic machine 324 instantiates node 220.

Additionally, a function-specific hardware device of physical topology 300 may instantiate a VTE of a virtual topology 200. As illustrated, hardware firewall 328 instantiates firewall 214.

A single digital device of physical topology 204 may instantiate multiple VTEs of a virtual topology 200. The digital device may instantiate multiple VTEs using multiple virtual machines, containers, and/or software applications. Alternatively, the digital device may instantiate multiple VTEs using a single virtual machine and/or software application. As illustrated, generic machine 326 instantiates both router 218 and NAT 216. Router 218 and NAT 216 may be executed by separate virtual machines and/or software application executing on generic machine 326. Alternatively, router 218 and NAT 216 may be executed by a same virtual machine and/or software application executing on generic machine 326.

The following is an example of the traversal of components in the transmission of data from node 212 to either node 220 or node 222. Initially, node 212 of generic machine 314 transmits the data to firewall 214, implemented by hardware firewall 328. Firewall 214 transmits the data to NAT 216 of generic machine 326. NAT 216 transmits the data to router 218 of generic machine 326. Based on a determination made by router 218, router 218 transmits the data to either node 220 of generic machine 324 or node 222 of generic machine 322.

As data is transmitted between VTEs, the data is tunneled through the underlying network corresponding to the physical topology 300. Each VTE is associated with an encapsulation-decapsulation network interface card (also referred to herein as an "encap-decap NIC"). An encap-decap NIC includes encapsulation mappings for VTEs in the virtual topology. An encapsulation mapping for a VTE includes (a) an overlay address corresponding to a VTE and (b) an underlay address that may be used to transmit data via the underlying network to the overlay address. The underlay address may be an address of a digital device that instantiates the VTE. Alternatively, the underlay address may be a next hop for forwarding data towards the VTE.

Referring to the illustrated example, node 212 generates data addressed to node 220 using the overlay address of node 220. An encap-decap NIC associated with node 212 receives the data. The encap-decap NIC determines that the data is addressed to the overlay address of node 220. The encap-decap NIC determines the underlay address of the next hop for forwarding the data towards node 220, which is the underlay address associated with firewall 214. The underlay address associated with firewall 214 is the underlay address of hardware firewall 328. The encap-decap NIC encapsulates the data using the underlay address associated with firewall 214. The encap-decap NIC transmits the encapsulated data to firewall 214.

An encap-decap NIC associated with firewall 214 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with NAT 216. The underlay address associated with NAT 216 is the underlay address of generic machine 326. The encap-decap NIC encapsulates the data using the underlay address associated with NAT 216. The encap-decap NIC transmits the encapsulated data to NAT 216.

An encap-decap NIC associated with NAT 216 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with router 218. The underlay address associated with router 218 is the underlay address of generic machine 326. The encap-decap NIC encapsulates the data using the underlay address associated with router 218. The encap-decap NIC transmits the encapsulated data to router 218.

An encap-decap NIC associated with router 218 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with node 220. The underlay address associated with node 220 is the underlay address of generic machine 324. The encap-decap NIC encapsulates the data using the underlay address associated with node 220. The encap-decap NIC transmits the encapsulated data to node 220.

In alternative embodiments, when data is transmitted from NAT 216 to router 218, generic machine 326 (and/or a component thereof) may determine that both NAT 216 and router 218 are implemented by generic machine 326. Hence, when the NAT 216 transmits data to the router 218, the data is not encapsulated. The NAT 216 transmits the data directly to the router 218. When the router 218 transmits the data to the next hop (which is implemented by a different machine of the physical topology 300), then the data is encapsulated for transmission through the underlay network.

As described above, there may be multiple ways to instantiate the same virtual topology on a physical topology. FIG. 4B illustrates another example of an instantiated virtual topology 404. The instantiated virtual topology 404 is based on the virtual topology 200 (illustrated in FIG. 2) and the physical topology 300 (illustrated in FIG. 3). An element of FIG. 4B that is labeled with a same number as a particular element of FIG. 2 or 3 corresponds to the particular element of FIG. 2 or 3.

As illustrated, generic machine 314 instantiates node 212. Generic machine 316 instantiates firewall 214b. Hardware router 318 instantiates router 218. Generic machine 322 instantiates firewall 214c and node 222. Generic machine 324 instantiates node 220. Generic machine 326 instantiates firewall 214a and NAT 216.

Multiple digital devices of physical topology 300 may instantiate a single VTE of the virtual topology 200. As illustrated, generic machines 326, 316, and 322 together instantiate firewall 214 of the virtual topology 200. In this example, firewall 214 is distributed to multiple digital devices. Each of firewall 214a, 214b, and 214c is a distributed element of firewall 214.

Data being processed by the computer network does not necessarily traverse all of the distributed elements of a single VTE. Data being processed by the computer network does not necessarily traverse various VTEs in a same order as indicated in the virtual topology 200. The following is an example of the traversal of components in the transmission of data from node 212 to node 220 or node 222. Initially, node 212 of generic machine 314 transmits the data to firewall 214a of generic machine 326. Firewall 214a transmits the data to NAT 216 of generic machine 326. NAT 216 transmits the data to hardware router 318. Based on a determination made by hardware router 318, hardware router 318 transmits the data to either firewall 214b of generic machine 316 or firewall 214c of generic machine 322. Firewall 214b transmits the data to node 220 of generic machine 324. Alternatively, firewall 214c transmits the data to node 222 of generic machine 322.

As illustrated in this example, the traversal of NAT 216 and hardware router 318 occurs between (a) the traversal of firewall 214a and (b) the traversal of firewall 214b. Alternatively, the traversal of NAT 216 and hardware router 318 occurs between (a) the traversal of firewall 214a and (b) the traversal of firewall 214c. Hence, the actual communication path taken by the data is different than the communication path indicated in the virtual topology 200.

Further, as illustrated in this example, data that is destined for node 220 traverses firewall 214a and firewall 214b, without traversing through firewall 214c. Alternatively, data that is destined for node 222 traverses firewall 214a and firewall 214c, without traversing through firewall 214b. Hence, the data does not necessarily traverse through all distributed elements (firewall 214a-c) of a single VTE.

Distribution of a single VTE across multiple digital devices may be performed for various reasons, such as increase performance, efficiency, and/or resilience of a computer network. As an example, a virtual topology 200 may specify the following functions for firewall 214:

(a) Reject data that has a source IP address of Address X;
(b) If the destination of the data is node 220, reject data that includes Data Y;
(c) If the destination of the data is node 222, reject data that includes Data Z.

Functions (b) and (c) are only executed for a subset of data that traverses firewall 214. Specifically, function (b) is executed only for data addressed to node 220. Function (c) is executed only for data addressed to node 222.

If firewall 214 is not distributed to multiple digital devices, then the single digital device that instantiates firewall 214 needs to perform all of functions (a), (b), and (c) on any data that traverses firewall 214. Firewall 214 needs to determine whether any data has a source IP address of Address X. Firewall 214 needs to determine whether the data is addressed to node 220, and if yes, whether the data includes Data Y. Firewall 214 needs to determine whether the data is addressed to node 222, and if yes, whether the data includes Data Z.

In contrast to the above example, distributing firewall 214 to multiple digital devices would require firewall 214a of generic machine 326 to only perform function (a) on a set of data that traverses firewall 214a. Thereafter, firewall 214a transmits the set of data to NAT 216 of generic machine 326. NAT 216 transmits the set of data to hardware router 318. Hardware router 318 routes a subset of data, addressed to node 220, to node 220. Hardware router 318 routes a subset of data, addressed to node 222, to node 222. As an inherent part of the routing functionality, hardware router 318 identifies the data for which function (b) is applicable (that is, data addressed to node 220). Hardware router 318 also identifies the data for which function (c) is applicable (that is, data addressed to node 222). Based on the determination made by hardware router 318, hardware router 318 transmits a subset of data to either firewall 214b or firewall 214c. Firewall 214b need only perform function (b) for the subset of data routed to firewall 214b. Firewall 214c need only perform function (c) for the subset of data routed to firewall 214c. Hence, firewalls 214a, 214b, and 214c operate in a distributed manner to increase performance and/or efficiency of the computer network.

As another example, NAT 216 of the virtual topology 200 may be instantiated as distributed elements on a physical topology. One instantiated NAT may not have sufficient capacity to handle the network traffic. Hence, multiple instances of NAT 216 are instantiated on the physical topology for load balancing and efficiency purposes. Each instance of NAT 216, on the physical topology, may be referred to as a "distributed element." Each instance of NAT 216 performs the same function as that specified for NAT 216 by the virtual topology 200.

The way that a virtual topology is instantiated on a physical topology may vary based on changes in the physical topology. As an example, a particular machine in a physical topology may instantiate a particular VTE. Over time, the particular machine may fail. A different machine in the physical topology may instantiate the particular VTE. As another example, a particular machine in a physical topology may instantiate a particular VTE. Over time, the network traffic may increase. An additional machine in the physical topology may also instantiate the particular VTE. Hence, the particular VTE becomes two distributed elements in the physical topology.

During instantiation, a set of mappings between the VTEs and the instantiated elements are stored in a data repository. Responsive to any changes in the virtual topology and/or the physical topology, changes to the set of mappings between the VTEs and the instantiated elements are updated in the data repository.

3. Single-Addressable VTE Simulation System Architecture

Figure 5A:
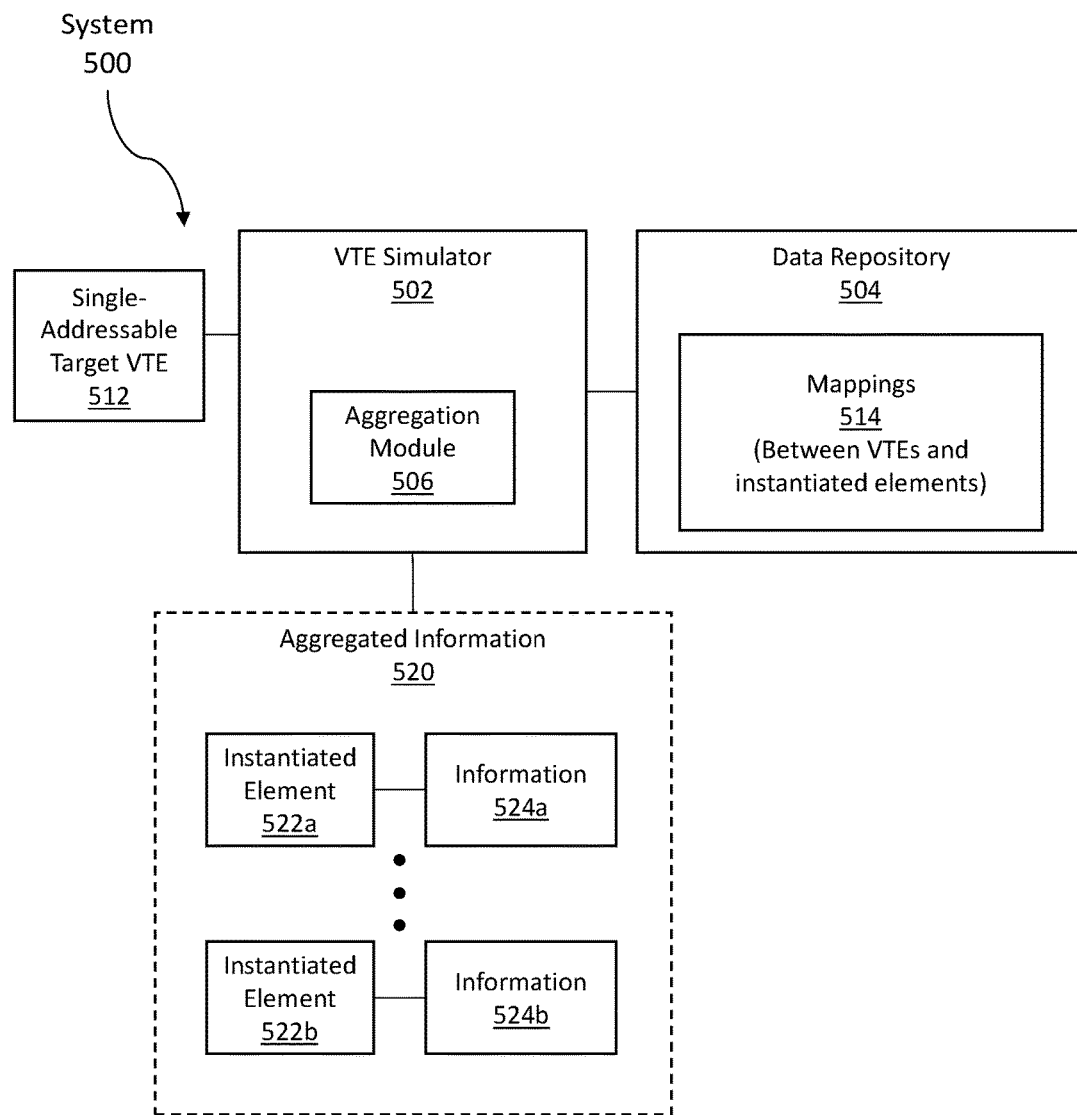
FIGS. 5A-B illustrate examples of a single-addressable virtual topology element (VTE) simulation system, in accordance with one or more embodiments.

FIG. 5A illustrates an example of a single-addressable virtual topology element (VTE) simulation system, in accordance with one or more embodiments. As illustrated in FIG. 5A, a system 500 includes a single-addressable target VTE 512, a VTE simulator 502, a data repository 504, and aggregated information 520. In one or more embodiments, the system 500 may include more or fewer components than the components illustrated in FIG. 5A. The components illustrated in FIG. 5A may be local to or remote from each other. The components illustrated in FIG. 5A may be implemented in software and/or hardware. Each component may be distributed over multiple applications and/or machines. Multiple components may be combined into one application and/or machine. Operations described with respect to one component may instead be performed by another component.

In one or more embodiments, a single-addressable target VTE 512 (also referred to as a "target VTE") is a VTE, as described above with reference to FIG. 1. The target VTE 512 may be distributed as multiple instantiated elements 522-a-b in a physical topology, as described above in Section 2.3, titled "Instantiation of a Virtual Topology on a Physical Topology." A particular instantiated element may perform all or only a portion of the functions of the target VTE 512. Each instantiated element may perform the same functions or different functions. However, the multiple instantiated elements 522a-b are addressable as a single entity. In this regard, the multiple instantiated elements 522a-b simulate a single entity. A user and/or application may obtain information associated with the target VTE 512 without being aware of how the target VTE 512 is instantiated, whether the target VTE 512 is distributed, and/or the instantiated elements that correspond to the target VTE 512. The user and/or application obtains information associated with the target VTE 512 as if the target VTE 512 were a single entity.

In one or more embodiments, a data repository 504 is any type of storage unit and/or device (e.g., a file system, database, collection of tables, or any other storage mechanism) for storing data. Further, a data repository 504 may include multiple different storage units and/or devices. The multiple different storage units and/or devices may or may not be of the same type or located at the same physical site. Further, a data repository 504 may be implemented or may execute on the same computing system as a VTE simulator 502. Alternatively or additionally, a data repository 504 may be implemented or executed on a computing system separate from a VTE simulator 502. A data repository 504 may be communicatively coupled to a VTE simulator 502 via a direct connection or via a network.

Information describing a set of mappings 514 between VTEs and instantiated elements may be implemented across any of components within the system 500. However, this information is illustrated within the data repository 504 for purposes of clarity and explanation.

In one or more embodiments, a set of mappings 514 identifies which instantiated elements, in a physical topology, perform a function of a particular VTE, in a virtual topology. The set of mappings 514 are updated to reflect any changes in the way that the virtual topology is instantiated on the physical topology. The way that the virtual topology is instantiated on the physical topology may vary based on changes in the physical topology, as described above in Section 2.3, titled "Instantiation of a Virtual Topology on a Physical Topology."

Figure 4B:
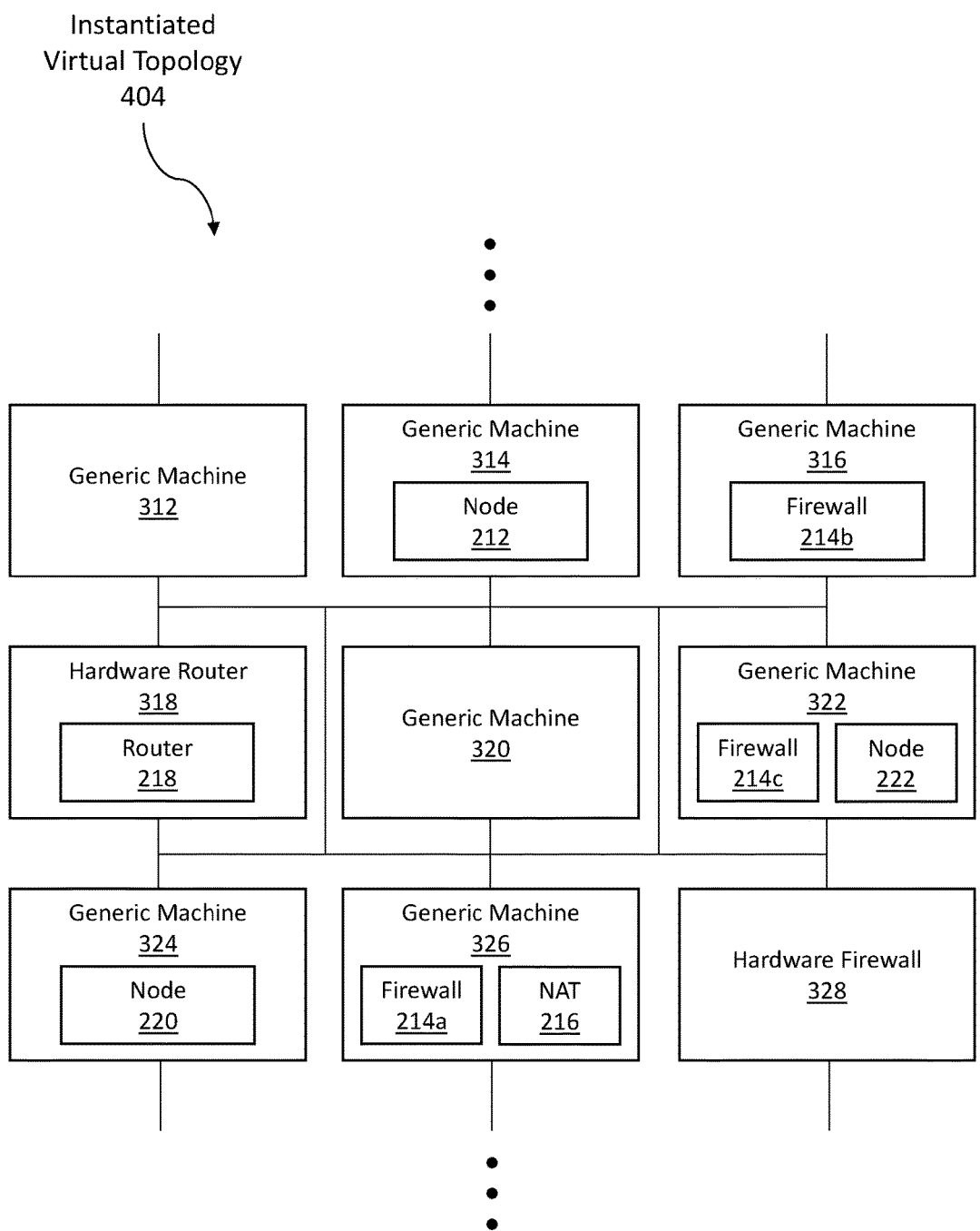

Referring to FIGS. 2, 3, and 4B as an example, FIG. 4B illustrates an example of an instantiated virtual topology 404, which is based on the virtual topology 200 and the physical topology 300. Generic machines 326, 316, and 322 together instantiate firewall 214 of the virtual topology 200. In this example, firewall 214 is distributed as instantiated elements 214a, 214b, and 214c. Firewall 214 may be configured to perform the following functions:
  (a) Reject data that has a source IP address of Address X;
  (b) If the destination of the data is node 220, reject data that includes Data Y;
  (c) If the destination of the data is node 222, reject data that includes Data Z.

The instantiated element 214a may be configured to perform only function (a). The instantiated element 214b may be configured to perform only function (b). The instantiated element 214c may be configured to perform only function (c).

A data repository may maintain a set of mappings between the VTEs, in the virtual topology 200, and the instantiated elements, in the physical topology 300. The set of mappings may indicate that the instantiated element 214a performs function (a) associated with the firewall 214. The set of mappings may indicate that the instantiated element 214b performs function (b) associated with the firewall 214. The set of mappings may indicate that the instantiated element 214c performs function (c) associated with the firewall 214.

In one or more embodiments, an instantiated element is an element, executed in a physical topology, that is configured to perform one or more functions associated with a VTE, as described above in Section 2.3, titled "Instantiation of a Virtual Topology on a Physical Topology." As illustrated in FIG. 5A, instantiated elements 522a-b correspond to the target VTE 512. Instantiated elements 522a-b are configured to perform a function associated with the target VTE 512.

In one or more embodiments, a set of information (such as information 524a and/or information 524b) is associated with each instantiated element (such as instantiated element 522a and/or instantiated element 522b), corresponding to a target VTE 512. The information associated with a particular instantiated element includes but is not limited to: (a) network data being received and/or transmitted by the particular instantiated element; (b) attributes and/or statistics associated with network data being received and/or transmitted by the particular instantiated element; and (c) attributes and/or statistics associated with the particular instantiated element.

In one or more embodiments, aggregated information 520 includes information (such as information 524a and/or information 524b) that is aggregated from each instantiated element (such as instantiated element 522a and/or instantiated element 522b), corresponding to a target VTE 512. The aggregated information 520 is used to determine information associated with the target VTE 512, as if the target VTE 512 were a single entity. In response to a request for information associated with the target VTE 512, a user interface may present the aggregated information 520 as information associated with the target VTE 512.

In one or more embodiments, a VTE simulator 502 refers to hardware and/or software configured to perform operations described herein for implementing a single-addressable target VTE 512 in a virtual topology. The VTE simulator 502 includes an aggregation module 506 that obtains information associated with a single-addressable target VTE 512. Obtaining information associated with the target VTE 512 includes obtaining a set of information 524a-b from each instantiated element 522a-b, and determining aggregated information 520 from the sets of information. Examples of operations for obtaining information associated with a single-addressable target VTE 512 are described below with reference to FIG. 6. The VTE simulator 502 is implemented on one or more digital devices.

Figure 5B:
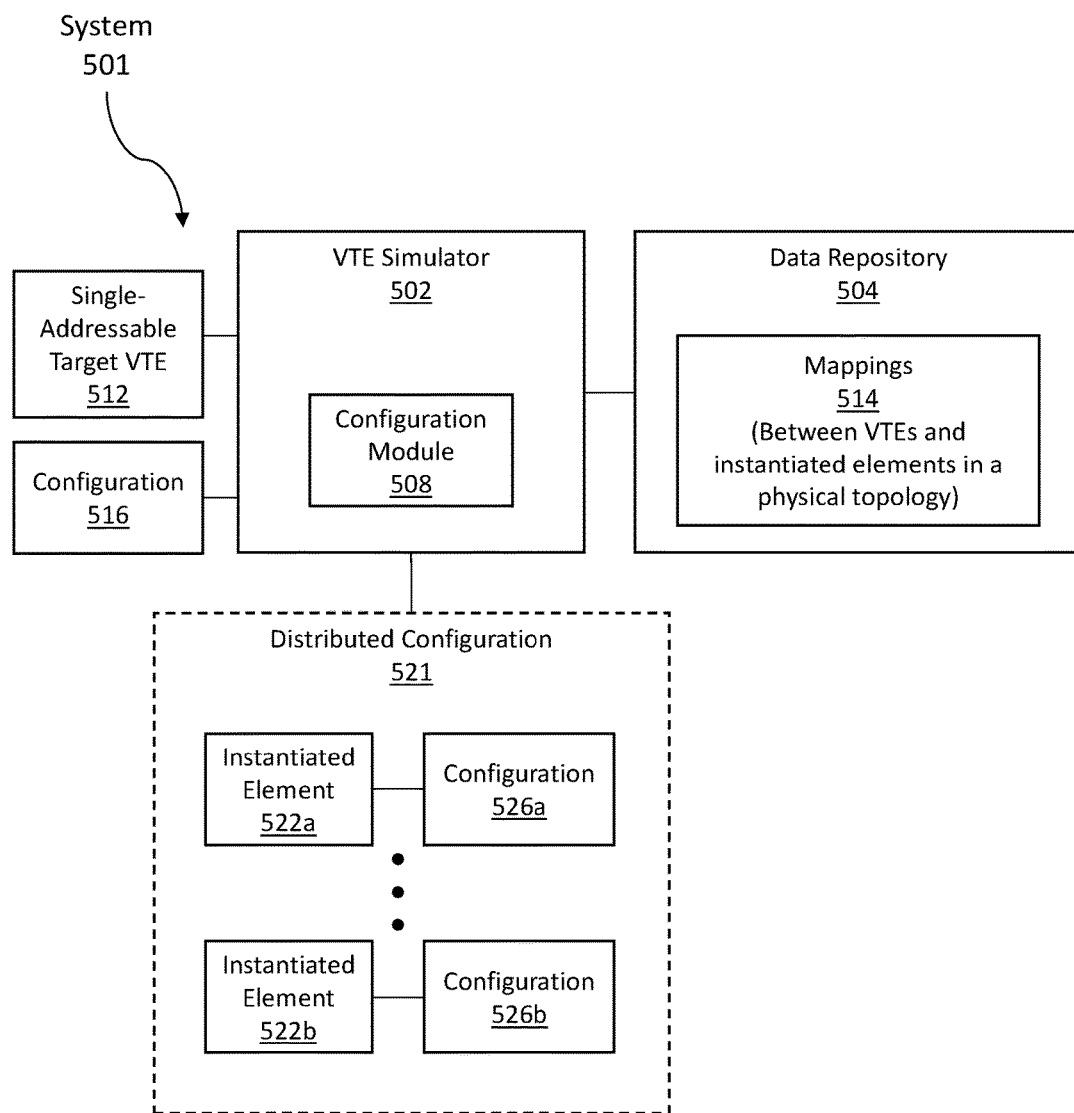

FIG. 5B illustrates another example of a single-addressable virtual topology element (VTE) simulation system, in accordance with one or more embodiments. As illustrated in FIG. 5B, a system 501 includes a single-addressable target VTE 512, a configuration 516, a VTE simulator 502, a data repository 504, and a distributed configuration 521. In one or more embodiments, the system 501 may include more or fewer components than the components illustrated in FIG. 5B. The components illustrated in FIG. 5B may be local to or remote from each other. The components illustrated in FIG. 5B may be implemented in software and/or hardware. Each component may be distributed over multiple applications and/or machines. Multiple components may be combined into one application and/or machine. Operations described with respect to one component may instead be performed by another component. Elements that are labeled with the same number across FIGS. 5A-B refer to the same element.

In one or more embodiments, a configuration 516 includes a set of parameters and/or attributes that are used to configure a single-addressable target VTE 512. Despite the fact that the target VTE 512 may be distributed as multiple instantiated elements 522a-b, a single configuration 516 may be input to the VTE simulator 502 in order to configure the target VTE 512. Based on the configuration 516, the target VTE 512 is configured as if the target VTE 512 were a single entity.

Different parameters are configurable for VTEs implementing different functions. As an example, a VTE may implement a firewall function. A configuration of the VTE may specify the criteria for filtering data through a firewall. One possible configuration is to block data addressed to a particular address. Another possible configuration is to block (a) data associated with a confidential flag and (b) video data. Another possible configuration is to block data from a particular source if the data transmitted by the particular source, over a particular time period, exceeds a specified threshold.

As another example, a VTE may implement a deep-packet inspection (DPI) function. A configuration of the VTE may specify the criteria for filtering data through a DPI. One possible configuration is to block data that matches any virus code in the DPI's virus database. Another possible configuration is to block data that is indicative of spam content.

In one or more embodiments, a configuration (such as configuration 526a and/or configuration 526b) includes a set of parameters and/or attributes corresponding to a particular instantiated element (such as instantiated element 522a and/or instantiated element 522b), corresponding to a target VTE 512. The configuration for a particular instantiated element is determined based on the overall configuration 516 for the target VTE 512. The configuration for a particular instantiated element may include all the parameters and/or attributes of the overall configuration 516. Additionally or alternatively, the configuration for a particular instantiated element may include only a subset of the parameters and/or attributes of the overall configuration 516.

In one or more embodiments, a distributed configuration 521 refers to the set of configurations (such as configuration 526a and/or configuration 526b) for the respective instantiated elements (such as instantiated element 522a and/or instantiated element 522b), corresponding to a target VTE 512.

As described above, a VTE simulator 502 refers to hardware and/or software configured to perform operations described herein for implementing a single-addressable target VTE 512 in a virtual topology. The VTE simulator 502 includes a configuration module 508 that configures a single-addressable target VTE 512. Configuring the target VTE 512 includes applying a configuration to each instantiated element 522a-b based on an overall configuration 516 for the target VTE 512. Examples of operations for configuring a single-addressable target VTE 512 are described below with reference to FIG. 7.

4. Implementing a Single-Addressable VTE in a Virtual Topology

One or more embodiments include implementing a single-addressable VTE in a virtual topology. A VTE in a virtual topology may be distributed as multiple instantiated elements in a physical topology. However, the multiple instantiated elements are addressable as a single entity. In this regard, the multiple instantiated elements simulate a single entity. Examples of addressing the VTE as a single entity include obtaining information associated with a single-addressable VTE and configuring a single-addressable VTE.

A. Obtaining Information Associated with a Single-Addressable VTE

Figure 6:
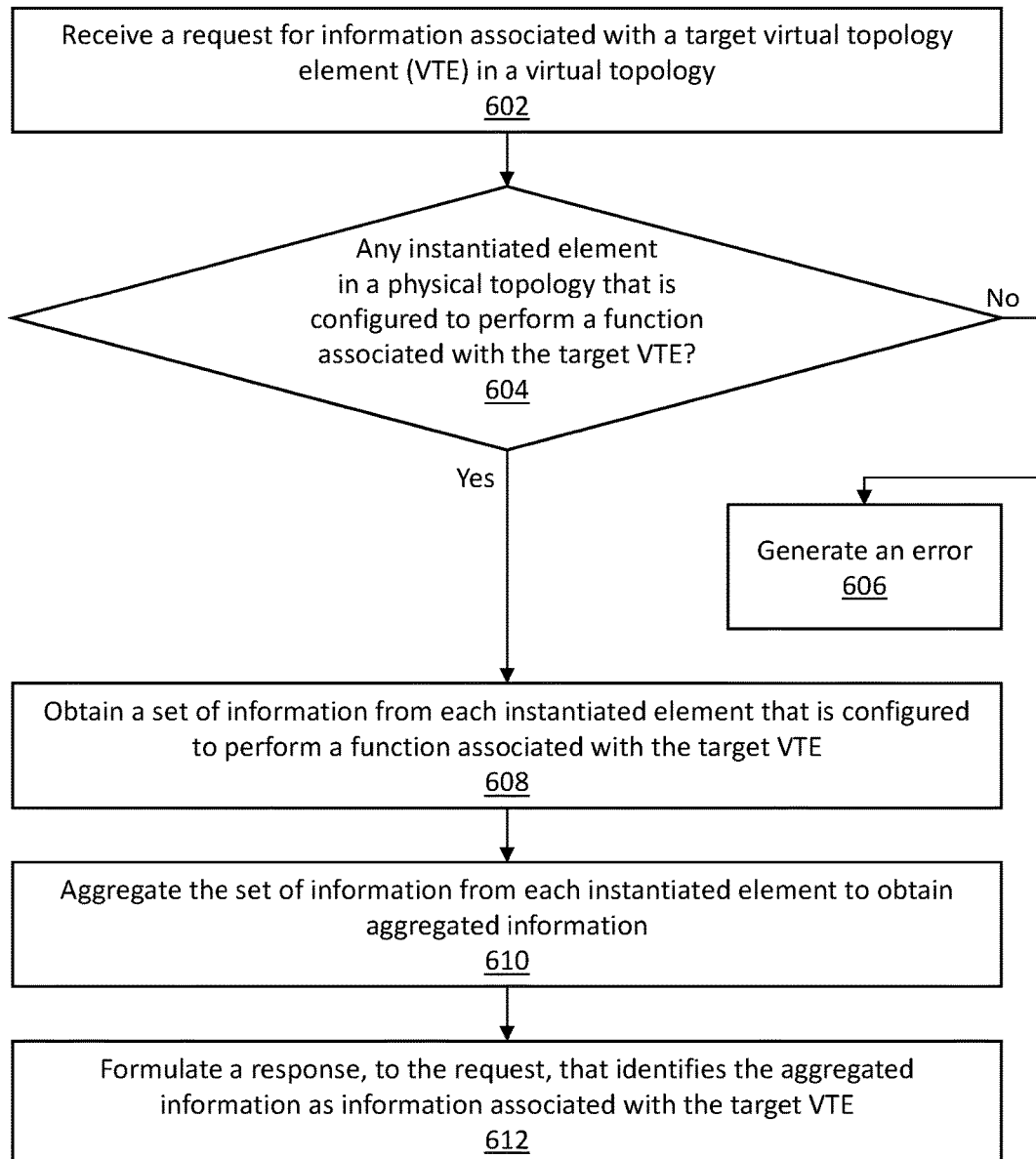
FIG. 6 illustrates an example set of operations for obtaining information associated with a single-addressable VTE, in accordance with one or more embodiments.

FIG. 6 illustrates an example set of operations for obtaining information associated with a single-addressable VTE, in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

One or more embodiments include receiving a request for information associated with a target VTE in a virtual topology (Operation 602). A VTE simulator 502 receives the request via a user interface and/or from another application.

As an example, a user interface may present a graphical representation of a virtual topology. The graphical representation may show a set of VTEs and links between the VTEs. A user may select, via the user interface, a target VTE from the virtual topology. The user may submit a request for information associated with the target VTE.

One or more embodiments include determining whether any instantiated element in a physical topology is configured to perform a function associated with the target VTE (Operation 604). As described above, a data repository 504 maintains a set of mappings between the VTEs and the instantiated elements. The VTE simulator 502 determines a subset of the set of mappings that correspond to the target VTE. Based on the subset of mappings, the VTE simulator 502 determines the instantiated elements corresponding to the target VTE. The instantiated elements, corresponding to the target VTE, perform a function associated with the target VTE. A particular instantiated element may perform all functions of the target VTE. Additionally or alternatively, a particular instantiated element may perform only a subset of the functions of the target VTE.

However, if none of the mappings correspond to the target VTE, then there are no instantiated elements configured to perform a function associated with the target VTE.

If there are no instantiated elements configured to perform a function associated with the target VTE, then an error is generated (Operation 606). The VTE simulator 502 may cause an error message to be presented at the user interface. Additionally or alternatively, the VTE simulator 502 may cause an error message to be transmitted to one or more users (such as an administrator of the virtual topology).

One or more embodiments include obtaining a set of information from each instantiated element that is configured to perform a function associated with the target VTE (Operation 608). The VTE simulator 502 may obtain information from each instantiated element in various ways.

In an embodiment, the VTE simulator 502 submits a request to tap the target VTE to a tapping infrastructure. Each instantiated element, corresponding to the target VTE, applies a tapping function to data received by the target VTE and/or data to be transmitted by the target VTE. The tapping function includes: applying a tap filter to a set of data; replicating the data that passes the tap filter; and transmitting the replicated data to a virtual endpoint. The replicated data may be referred to as "tapped data." The virtual endpoint transmits the tapped data to the VTE simulator 502. Each instantiated element may transmit the respective tapped data to the same virtual endpoint and/or different virtual endpoints. In addition to applying the tapping function, each instantiated element implements one or more functions of the target VTE, as specified in the virtual topology. The VTE simulator 502 receives the tapped data from each instantiated element via one or more virtual endpoints.

In an embodiment, the VTE simulator 502 submits a request to tap the target VTE to a tapping infrastructure. A tapping element is instantiated for each instantiated element. Data destined for a particular instantiated element is routed to the corresponding tapping element. Additionally or alternatively, data transmitted by a particular instantiated element is routed to the corresponding tapping element. Each tapping element applies a tapping function to data received by the tapping element. The tapping function includes: applying a tap filter to a set of data; replicating the data that passes the tap filter; and transmitting the replicated data to a virtual endpoint. The replicated data may be referred to as "tapped data." The virtual endpoint transmits the tapped data to the VTE simulator 502. Each tapping element may transmit the respective tapped data to the same virtual endpoint and/or different virtual endpoints. In addition to applying the tapping function, each tapping element forwards data, received by the tapping element, to the instantiated element for which the data is destined. The VTE simulator 502 receives the tapped data from each tapping element via one or more virtual endpoints.

Additional descriptions regarding implementing a tapping function are included in the related to U.S. Non-Provisional patent application Ser. No. 15/431,426, filed Feb. 13, 2017, which is hereby incorporated by reference.

In an embodiment, the VTE simulator 102 queries each instantiated element for a set of information. The information queried may be, for example: (a) network data being received and/or transmitted by the particular instantiated element; (b) attributes and/or statistics associated with network data being received and/or transmitted by the particular instantiated element; and (c) attributes and/or statistics associated with the particular instantiated element.

As an example, a VTE simulator may query each instantiated element for the number of errors generated by the instantiated element within the last hour. Each instantiated element may respond by transmitting the number of errors generated within the last hour.

As another example, each instantiated element may have a limited capacity to process network data. A VTE simulator may query each instantiated element for the amount of available capacity from each instantiated element. Each instantiated element may respond by transmitting the amount of available capacity.

In an embodiment, a particular instantiated element performs functions of the target VTE as well as other VTEs in the virtual topology. The VTE simulator 502 obtains a set of information from the particular instantiated element. A portion of the information corresponds to the target VTE. Another portion of the information corresponds to the other VTEs. The VTE simulator 502 selects the portion of information that corresponds to the target VTE, but not the portion of information that corresponds to other VTEs, for aggregation with information obtained from other instantiated elements.

One or more embodiments include aggregating the set of information from each instantiated element to obtain aggregated information (Operation 610). The VTE simulator 502 may obtain information from each instantiated element in various ways.

In an embodiment, the VTE simulator 502 functions as a tap aggregator. The VTE simulator 502 aggregates multiple streams of tapped data, received from multiple instantiated elements and/or tapping elements. The VTE simulator determines a chronological order in which the streams of tapped data are received. The tap aggregator may generate a single stream of aggregated data, including all streams of tapped data, in accordance with the chronological order. The stream of aggregated data may interleave the multiple streams of tapped data from the multiple sources.

In an embodiment, the VTE simulator 502 determines a statistic associated with multiple streams of tapped data, received from multiple instantiated elements and/or tapping elements. Examples of statistics include a total amount of data transmitted in the multiple streams of tapped data, and a total number of errors included in the multiple streams of tapped data.

In an embodiment, the VTE simulator 502 determines a combined statistic based on statistics from each instantiated element. As an example, a VTE simulator may query each instantiated element for the amount of available capacity from each instantiated element. The VTE simulator may determine the total amount of available capacity of the set of instantiated elements, corresponding to the target VTE, based on the amount of available capacity of each instantiated element.

In an embodiment, the VTE simulator 502 transmits the information from each instantiated element to an aggregation component. The aggregation component may generate a single stream of aggregated data based on the information from each instantiated element. Additionally or alternatively, the aggregation component determines a statistic associated with the information from each instantiated element. The aggregation component returns the aggregated information to the VTE simulator 502.

In an embodiment, Operation 610 is performed after Operation 602. The VTE simulator 502 aggregates the information from the instantiated elements in response to a request to obtain information associated with the target VTE. In an alternative embodiment, Operation 610 is performed before Operation 602. The VTE simulator 502 aggregates information from the instantiated elements and stores the aggregated information at a data repository. If the VTE simulator 502 receives a request to obtain information associated with the target VTE, then the VTE simulator 502 retrieves the aggregated information from the data repository. The VTE simulator 502 transmits the aggregated information in response to the request.

One or more embodiments include formulating a response, to the request, that identifies the aggregated information as information associated with the target VTE (Operation 612). The VTE simulator 502 removes any metadata that identifies the aggregated information as being transmitted from an instantiated element. As an example, the information obtained from a particular instantiated element may include a source address. The source address may be an overlay address of the particular instantiated element and/or an underlay address of a generic machine implementing the particular instantiated element. A VTE simulator may remove the source address from the information obtained from the particular instantiated element.

The VTE simulator 502 adds metadata that identifies the aggregated information as being transmitted from and/or associated with the target VTE. As an example, a VTE simulator may add a source address to the aggregated information. The source address may be an address corresponding to the target VTE.

The VTE simulator 502 transmits the information associated with the target VTE as a response to the request received at Operation 602. The VTE simulator 502 presents the information associated with the target VTE at a user interface.

B. Configuring a Single-Addressable VTE

Figure 7:
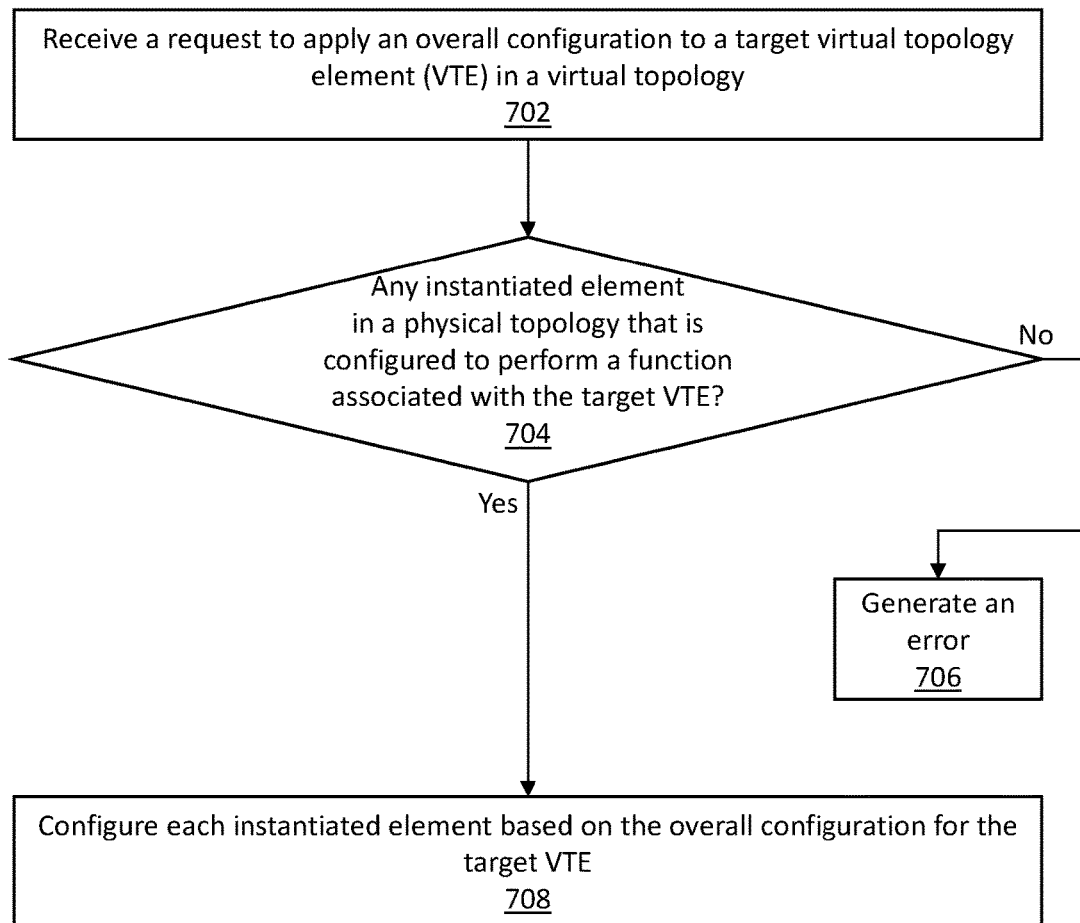
FIG. 7 illustrates an example set of operations for configuring a single-addressable VTE, in accordance with one or more embodiments.

FIG. 7 illustrates an example set of operations for configuring a single-addressable VTE, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include receiving a request to apply an overall configuration to a target VTE in a virtual topology (Operation 702). A VTE simulator 502 receives the request via a user interface and/or from another application. The request specifies the overall configuration for the target VTE. The overall configuration may include multiple parameters and/or attributes.

As an example, a user interface may present a graphical representation of a virtual topology. The graphical representation may show a set of VTEs and links between the VTEs. A user may select, via the user interface, a target VTE from the virtual topology. The user may submit a request to apply a particular configuration to the target VTE.

One or more embodiments include determining whether any instantiated element in a physical topology is configured to perform a function associated with the target VTE (Operation 704). Descriptions relating to determining whether any instantiated element is configured to perform a function associated with the target VTE are included above with reference to Operation 604.

If there are no instantiated elements, in a physical topology, configured to perform a function associated with the target VTE, then an error is generated (Operation 706). Descriptions relating to generating an error are included above with reference to Operation 606.

One or more embodiments include configuring each instantiated element based on the overall configuration for the target VTE (Operation 708). The VTE simulator 502 identifies each instantiated element corresponding to the target VTE. The VTE simulator 502 determines whether each instantiated element performs all functions of the target VTE or only a subset of functions of the target VTE.

If a particular instantiated element performs all functions of the target VTE, then the VTE simulator 502 determines that a configuration for the particular instantiated element is the same as the overall configuration for the target VTE. The VTE simulator 502 applies the overall configuration to the particular instantiated element.

If a particular instantiated element performs only a subset of functions of the target VTE, then the VTE simulator 502 determines a portion of the overall configuration that is relevant to the subset of functions. Additionally or alternatively, the VTE simulator 502 determines a portion of the overall configuration that may be added to the subset of functions. The VTE simulator 502 applies only the portion of the overall configuration to the particular instantiated element.

As an example, a target VTE may perform a firewall function. The filter policies for the firewall function may be as follows:
  (a) Reject data that has a source IP address of Address X;
  (b) If the destination of the data is a particular router node, reject data that includes Data Y.

The target VTE may be distributed into two instantiated elements. A first instantiated element may perform the same firewall function as the target VTE, performing all functions (a)-(b). A second instantiated element may perform only function (b) of the target VTE.

A user may request to apply a modified overall configuration to the target VTE. Specifically, the modified overall configuration includes the following filter policies:
 (a) Reject data that has a source IP address of Address X;
 (b) If the destination of the data is the particular router node, reject data that includes Data Y or Data W.

Comparing the original configuration and the modified configuration of the target VTE, only function (b) has been modified.

A VTE simulator receives the configuration request. The VTE simulator determines that the first instantiated element performs all functions of the target VTE. The VTE simulator determines that the configuration for the first instantiated element is the same as the overall configuration for the target VTE. Hence, the VTE simulator configures the first instantiated element as follows:
 (a) Reject data that has a source IP address of Address X;
 (b) If the destination of the data is the particular router node, reject data that includes Data Y or Data W.

The VTE simulator determines that the second instantiated element performs only a subset of functions of the target VTE. The VTE simulator determines that the relevant configuration for the second instantiated element includes only function (b) of the overall configuration of the target VTE. Hence, the VTE simulator configures the second instantiated element as follows:
 (b) If the destination of the data is the particular router node, reject data that includes Data Y or Data W.

As illustrated in this example, the VTE simulator determines a configuration for each instantiated element, based on the overall configuration for the target VTE. The VTE simulator applies the respective configuration to each instantiated element.

5. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 8:
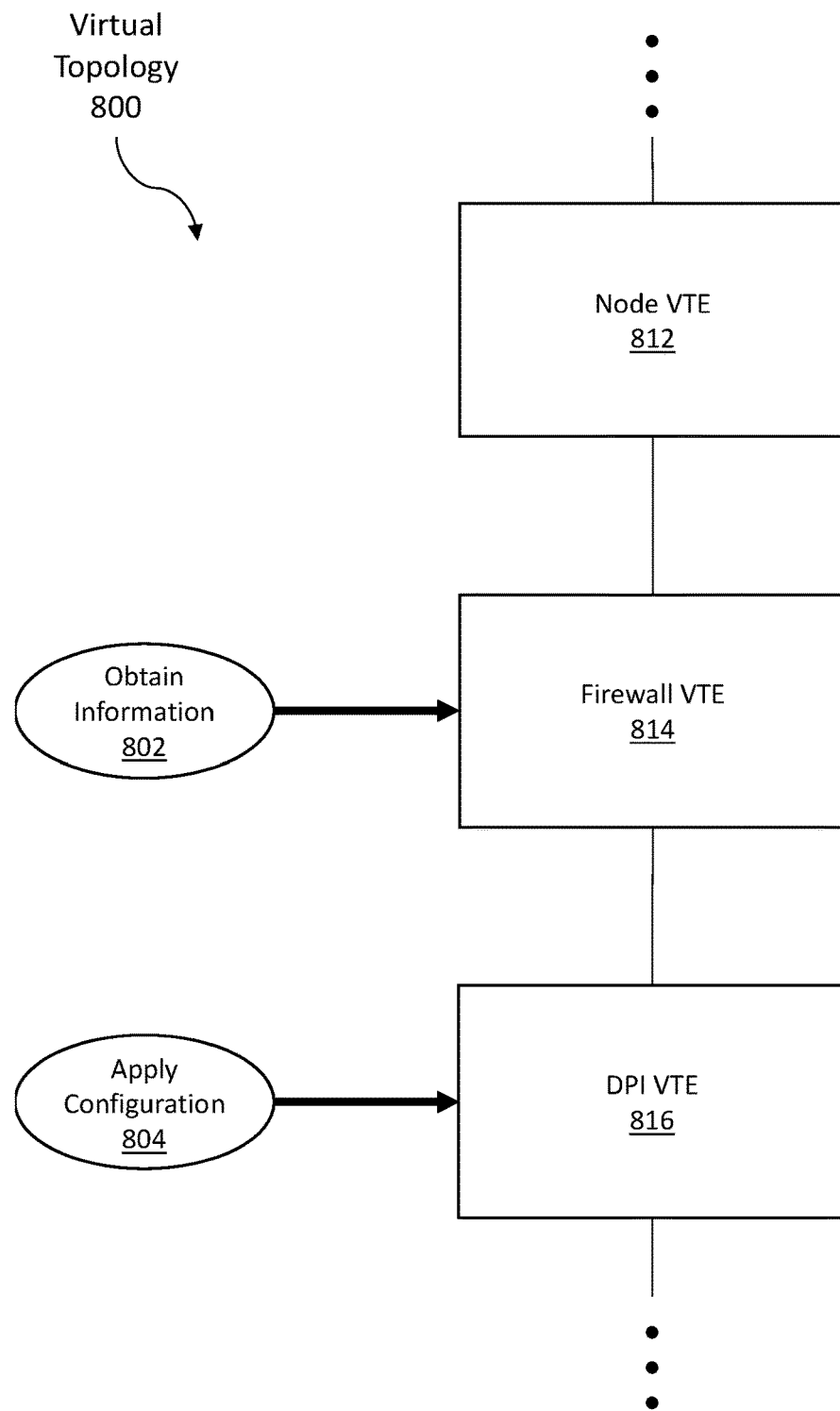
FIGS. 8-9 illustrate examples of implementing a single-addressable VTE in a virtual topology, in accordance one or more embodiments.
Figure 9:
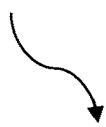
Figure 9:
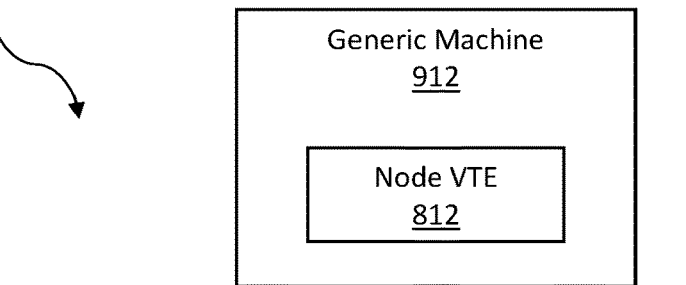
Figure 9:
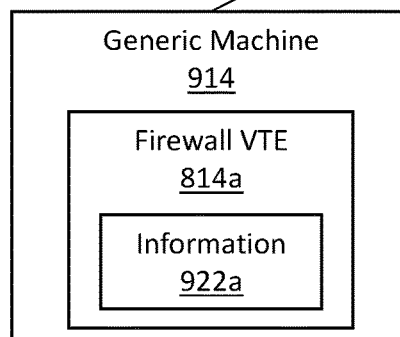
Figure 9:
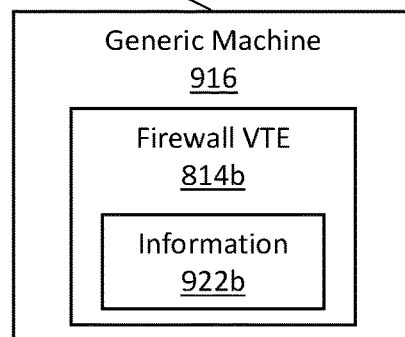
Figure 9:
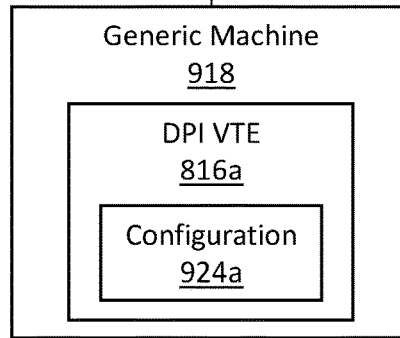
Figure 9:
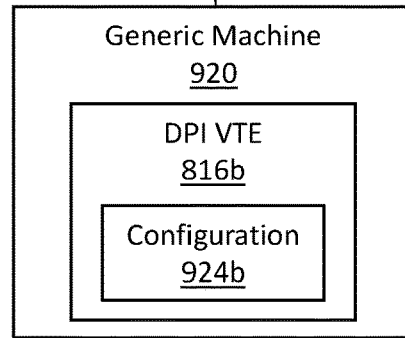

FIGS. 8-9 illustrate examples of implementing a single-addressable VTE in a virtual topology, in accordance one or more embodiments.

FIG. 8 illustrates a virtual topology 800. The virtual topology 800 includes a node VTE 812, a firewall VTE 814, and a deep-packet inspection (DPI) VTE 816.

The firewall VTE 814 performs the following functions:
 (a) Reject data that has a source IP address of Address X;
 (b) If the destination of the data is a particular router node, reject data that includes Data Y.

The DPI VTE 816 performs the following functions:
 (a) Reject data that includes Virus X or Virus Y;
 (b) Reject data that includes Spyware Y.

FIG. 9 illustrates instantiated elements 900 in a physical topology, based on the virtual topology 800. The firewall VTE 814 is mapped to a distributed implementation, including the instantiated firewall VTE 814a and the instantiated firewall VTE 814b. The instantiated firewall VTE 814a performs function (a) of the firewall VTE 814. The instantiated firewall VTE 814b performs function (b) of the firewall VTE 814. The DPI VTE 816 is mapped to a distributed implementation, including the instantiated DPI VTE 816a and the instantiated DPI VTE 816b. The instantiated DPI VTE 816a performs function (a) of the DPI VTE 816. The instantiated DPI VTE 816b performs function (b) of the DPI VTE 816.

As illustrated, generic machine 912 instantiates the node VTE 812. Generic machine 914 instantiates the firewall VTE 814a. Generic machine 916 instantiates the firewall VTE 814b. Generic machine 918 instantiates the DPI VTE 816a. Generic machine 920 instantiates the DPI VTE 816b.

A user submits a request 802 to obtain information associated with the firewall VTE 814 in the virtual topology 800. A VTE simulator retrieves a set of mappings between VTEs in the virtual topology 800 and instantiated elements 900 in the physical topology from a data repository. Based on the set of mappings, the VTE simulator determines that the instantiated firewall VTE 814a and the instantiated firewall VTE 814b are configured to perform a function of the firewall VTE 814.

The VTE simulator queries the instantiated firewall VTE 814a for a set of information 922a. The set of information 922a indicates that the instantiated firewall VTE 814a generated twelve errors within the past 60 minutes. The VTE simulator queries the instantiated firewall VTE 814b for a set of information 922b. The set of information 922b indicates that the instantiated firewall VTE 814b generated one error within the past 60 minutes.

The VTE simulator aggregates the information from the instantiated firewall VTE 814a and the instantiated firewall VTE 814b. The VTE simulator computes an overall statistic based on the information. The VTE simulator determines that a total of thirteen errors were generated in the past 60 minutes by the instantiated firewall VTE 814a and the instantiated firewall VTE 814b.

The VTE simulator returns a response to the user's request for information, indicating that the firewall VTE 814 generated a total of thirteen errors in the past 60 minutes. The VTE simulator presents the information at a user interface.

Additionally, a user submits a request 804 to apply a modified overall configuration to the DPI VTE 816 in the virtual topology 800. The modified overall configuration for the DPI VTE is as follows:
 (a) Reject data that includes Virus X;
 (b) Reject data that includes Spyware Y;
 (c) Reject data that performs a particular security attack.

The VTE simulator retrieves the set of mappings between VTEs in the virtual topology 800 and instantiated elements 900 in the physical topology from the data repository. Based on the set of mappings, the VTE simulator determines that the instantiated DPI VTE 816a and the instantiated DPI VTE 816b are configured to perform a function of the DPI VTE 816.

The VTE simulator determines that the instantiated DPI VTE 816a performs function (a) of the DPI VTE 816. The VTE simulator determines that function (a) of the modified overall configuration, of the DPI VTE 816, is relevant to the instantiated DPI VTE 816a. Additionally, the VTE simulator determines that function (b) of the modified overall configuration, of the DPI VTE 816, is not relevant to the instantiated DPI VTE 816a. Additionally, the VTE simulator determines that function (c) of the modified overall configuration, of the DPI VTE 816, is newly added to the DPI VTE 816. The VTE simulator determines that function (c) may be added to the functions performed by the instantiated DPI VTE 816a. Hence, the VTE simulator determines that a configuration 924a, for the instantiated DPI VTE 816a, includes the following portions of the modified overall configuration of the DPI VTE 816:

(a) Reject data that includes Virus X;
(c) Reject data that performs the particular security attack.

The VTE simulator determines that the instantiated DPI VTE 816*b* performs function (b) of the DPI VTE 816. The VTE simulator determines that function (a) of the modified overall configuration, of the DPI VTE 816, is not relevant to the instantiated DPI VTE 816*b*. Additionally, the VTE simulator determines that function (b) of the modified overall configuration, of the DPI VTE 816, is relevant to the instantiated DPI VTE 816*b*. Additionally, the VTE simulator determines that function (c) of the modified overall configuration, of the DPI VTE 816, is newly added to the DPI VTE 816. The VTE simulator determines that function (c) may be added to the functions performed by the instantiated DPI VTE 816*b*. Hence, the VTE simulator determines that a configuration 924*b*, for the instantiated DPI VTE 816*b*, includes the following portions of the modified overall configuration of the DPI VTE 816:

(b) Reject data that includes Spyware Y;
(c) Reject data that performs the particular security attack.

Hence, based on the configurations 924*a-b* applied by the VTE simulator, the instantiated DPI VTE 816*a* performs function (a) of the modified overall configuration of the DPI VTE 816. The instantiated DPI VTE 816*b* performs function (b) of the modified overall configuration of the DPI VTE 816. Both the instantiated DPI VTE 816*a* and the instantiated DPI VTE 816*b* perform function (c) of the modified overall configuration of the DPI VTE 816.

6. Computer Networks

In one or more embodiments, a computer network provides connectivity among a set of nodes. The set of nodes are connected by a set of links. The nodes may be local to and/or remote from each other. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a service provider provides a computer network to one or more end users. Various service models may be implemented by the computer network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, and/or tenant isolation.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
 receiving a request for information associated with a virtual topology element (VTE) in a virtual topology;
 identifying a plurality of instantiated elements, in a physical topology, that is configured to perform a function associated with the VTE in the virtual topology;
 obtaining a set of information from each of the plurality of instantiated elements;
 wherein obtaining the set of information from a particular instantiated element of the plurality of instantiated elements comprises:
  identifying data received by the particular instantiated element;
  determining that a first portion of the data received by the particular instantiated element corresponds to the VTE in the virtual topology, and a second portion of the data received by the particular instantiated element corresponds to another VTE in the virtual topology;
  selecting the first portion of the data received by the particular instantiated element to be included in the set of information from the particular instantiated element, without selecting the second portion of the data received by the particular instantiated element to be included in the set of information from the particular instantiated element; and
 aggregating the set of information from each of the plurality of instantiated elements to obtain the information associated with the VTE in the virtual topology.

2. The medium of claim 1, wherein the operations further comprise:
 identifying a set of functions associated with the VTE in the virtual topology; and
 executing the plurality of instantiated elements in the physical topology, such that each of the plurality of instantiated elements performs at least one of the set of functions.

3. The medium of claim 1, wherein each of the plurality of instantiated elements performs a same function associated with the VTE in the virtual topology.

4. The medium of claim 1, wherein each of the plurality of instantiated elements performs a different function associated with the VTE in the virtual topology.

5. The medium of claim 1, wherein the operations further comprise: presenting the information associated with the VTE in the virtual topology, aggregated from the set of information from each of the plurality of instantiated elements, at a user interface.

6. The medium of claim 1, wherein aggregating the set of information from each of the plurality of instantiated elements comprises transmitting the set of information, from each of the plurality of instantiated elements, to an aggregation component.

7. The medium of claim 1, wherein aggregating the set of information from each of the plurality of instantiated elements is performed subsequent to receiving the request for information associated with the VTE in the virtual topology.

8. The medium of claim 1, wherein aggregating the set of information from each of the plurality of instantiated elements is performed prior to receiving the request for information associated with the VTE in the virtual topology.

9. The medium of claim 1, wherein aggregating the set of information from each of the plurality of instantiated elements comprises:
 identifying metadata included in the set of information that identifies the set of information as being obtained from a particular element of the plurality of instantiated elements;
 removing the metadata from the set of information; and
 transmitting the set of information, without the metadata, to an aggregation component.

10. The medium of claim 1, wherein aggregating the set of information from each of the plurality of instantiated elements comprises:
 obtaining aggregated information based on the set of information from each of the plurality of instantiated elements; and
 adding metadata, to the aggregated information, that identifies the aggregated information as being associated with the VTE in the virtual topology.

11. The medium of claim 1, wherein aggregating the set of information from each of the plurality of instantiated elements comprises:
 determining a chronological order in which the set of information is received by each of the plurality of instantiated elements; and
 generating a single data set, including the set of information from each of the plurality of instantiated elements, in accordance with the chronological order.

12. The medium of claim 1, wherein aggregating the set of information from each of the plurality of instantiated elements comprises:
 computing a statistic corresponding to the set of information from each of the plurality of instantiated elements.

13. The medium of claim 12, wherein the statistic comprises a total amount of data received by each of the plurality of instantiated elements over a particular time period.

14. The medium of claim 12, wherein the statistic comprises a total number of errors generated by each of the plurality of instantiated elements over a particular time period.

15. The medium of claim 1, wherein the VTE is a single addressable component that is mapped to a distributed implementation comprising the plurality of instantiated elements.

16. A method, comprising:
 receiving a request for information associated with a virtual topology element (VTE) in a virtual topology;
 identifying a plurality of instantiated elements, in a physical topology, that is configured to perform a function associated with the VTE in the virtual topology;
 obtaining a set of information from each of the plurality of instantiated elements;
 wherein obtaining the set of information from a particular instantiated element of the plurality of instantiated elements comprises:
  identifying data received by the particular instantiated element;
  determining that a first portion of the data received by the particular instantiated element corresponds to the VTE in the virtual topology, and a second portion of the data received by the particular instantiated element corresponds to another VTE in the virtual topology;
  selecting the first portion of the data received by the particular instantiated element to be included in the set of information from the particular instantiated element, without selecting the second portion of the data received by the particular instantiated element to be included in the set of information from the particular instantiated element; and aggregating the set of information from each of the plurality of instantiated elements to obtain the information associated with the VTE in the virtual topology.

17. A system comprising:
at least one device including a hardware processor; and
the system configured to perform operations comprising:
receiving a request for information associated with a virtual topology element (VTE) in a virtual topology;
identifying a plurality of instantiated elements, in a physical topology, that is configured to perform a function associated with the VTE in the virtual topology;
obtaining a set of information from each of the plurality of instantiated elements;
wherein obtaining the set of information from a particular instantiated element of the plurality of instantiated elements comprises:
identifying data received by the particular instantiated element;
determining that a first portion of the data received by the particular instantiated element corresponds to the VTE in the virtual topology, and a second portion of the data received by the particular instantiated element corresponds to another VTE in the virtual topology;
selecting the first portion of the data received by the particular instantiated element to be included in the set of information from the particular instantiated element, without selecting the second portion of the data received by the particular instantiated element to be included in the set of information from the particular instantiated element; and
aggregating the set of information from each of the plurality of instantiated elements to obtain the information associated with the VTE in the virtual topology.

18. The system of claim 17, wherein aggregating the set of information from each of the plurality of instantiated elements comprises:
identifying metadata included in the set of information that identifies the set of information as being obtained from a particular element of the plurality of instantiated elements;
removing the metadata from the set of information; and
transmitting the set of information, without the metadata, to an aggregation component.

19. The system of claim 17, wherein aggregating the set of information from each of the plurality of instantiated elements comprises:
obtaining aggregated information based on the set of information from each of the plurality of instantiated elements; and
adding metadata, to the aggregated information, that identifies the aggregated information as being associated with the VTE in the virtual topology.

20. The system of claim 17, wherein aggregating the set of information from each of the plurality of instantiated elements comprises:
computing a statistic corresponding to the set of information from each of the plurality of instantiated elements.

* * * * *